(12) United States Patent
Yamaoka et al.

(10) Patent No.: US 6,999,623 B1
(45) Date of Patent: Feb. 14, 2006

(54) APPARATUS AND METHOD FOR RECOGNIZING AN OBJECT AND DETERMINING ITS POSITION AND SHAPE

(75) Inventors: Megumi Yamaoka, Tokyo (JP); Kenji Nagao, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 562 days.

(21) Appl. No.: 09/676,680

(22) Filed: Sep. 29, 2000

(30) Foreign Application Priority Data

Sep. 30, 1999 (JP) ................................. 11-278708
Jul. 18, 2000 (JP) ............................. 2000-216946

(51) Int. Cl.
G06K 9/62 (2006.01)

(52) U.S. Cl. ..................... 382/209; 382/190; 382/203

(58) Field of Classification Search ................ 382/209, 382/217, 219, 220, 221
See application file for complete search history.

(56) References Cited

U.S. PATENT DOCUMENTS

| 5,101,441 | A | * | 3/1992 | Yamaguchi | ................. 382/221 |
| 5,642,434 | A | * | 6/1997 | Nakao et al. | ................ 382/220 |
| 6,094,507 | A | * | 7/2000 | Monden | ...................... 382/195 |
| 6,301,387 | B1 | * | 10/2001 | Sun et al. | .................... 382/217 |
| 6,463,176 | B1 | * | 10/2002 | Matsugu et al. | ............ 382/195 |
| 6,584,213 | B1 | * | 6/2003 | Prakash et al. | ............. 382/107 |

FOREIGN PATENT DOCUMENTS

JP 6-215140 8/1994
JP 9-21610 1/1997

OTHER PUBLICATIONS

E. Persoon, et al. "Industrial Image Processing by means of an Image Recognition Integrated System", Proceedings of the International Conference on Pattern Recognition, IEEE Computer Society Press, vol. 2, pp. 402-407, Jun. 16, 1990.
European Search Report corresponding to application No. EP 00 12 1115 dated Dec. 14, 2004.

* cited by examiner

Primary Examiner—Samir Ahmed
Assistant Examiner—Charles Kim
(74) Attorney, Agent, or Firm—RatnerPrestia

(57) ABSTRACT

An object recognizing apparatus is provided which is capable of precisely recognizing an object in an input image with the use of a corresponding learning image even when a local-segment of the input image coincides with a learning-local-segment of another similar learning image. The apparatus comprises (1) image dividing means for dividing an input image, which is received from image input means, into local-segments, (2) similar-local-segment extracting means for extracting a similar learning-local-segment to the local-segment of the input image from a learning image database, (3) object position estimating means for estimating the position of an object to be identified in the input image from the coordinates of the local-segment and the coordinates of the learning-local-segment corresponding to the local-segment, (4) counting means for counting the local-segments coincide with their corresponding learning-local-segments, and (5) object determining means for judging that the object to be identified is present when a result of counting is greater than a predetermined number. Consequently, the object and its position in any input image can be detected at higher accuracy.

11 Claims, 32 Drawing Sheets

401 Input Image
402 Center Coordinates of Local-Segment
403 Arbitrary Window (70, 330)

| Center Coordinates of Input Window | Center Coordinates of Learning Window |
|---|---|
| (40, 100) | (75, 365) |
| (119, 86) | (159, 350) |
| (198, 72) | (230, 340) |
| ⋮ | ⋮ |
| (54, 179) | (90, 440) |
| ⋮ | ⋮ |
| (291, 88) | (225, 345) |
| ⋮ | ⋮ |
| (208, 19) | (240, 280) |

Fig. 7

| Position | Score |
|---|---|
| (74, 365) | 29 |
| (20, 365) | 5 |
| ⋮ | ⋮ |

Fig. 11
1101
Representative Window
(25, 15)
1103
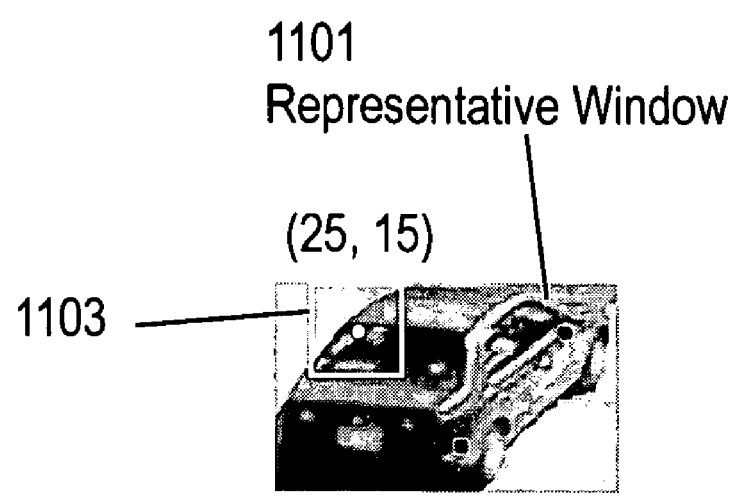
1102
Similar Window
(15, 20)
1104
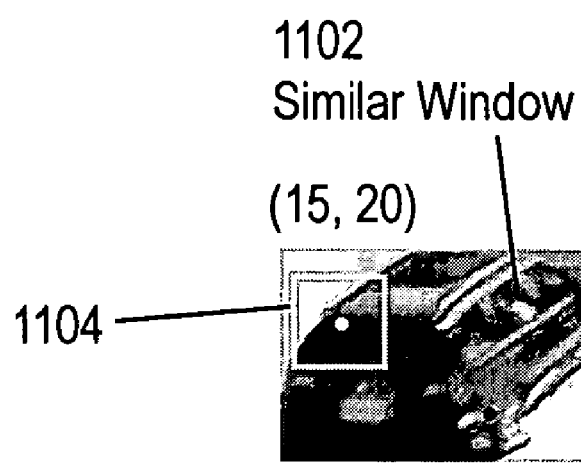

Fig. 12

| Center Coordinates of Input Window | Center Coordinates of Learning Window | Type of Learning Window |
|---|---|---|
| (40, 100) | (75, 365) | Sedan |
| (40, 100) | (150, 350) | Van |
| (40, 100) | (230, 340) | Wagon |
| ⋮ | ⋮ | ⋮ |
| (24, 178) | (90, 440) | ⋮ |
| ⋮ | ⋮ | ⋮ |
| (291, 88) | (225, 345) | ⋮ |
| ⋮ | ⋮ | ⋮ |
| (208, 19) | (240, 280) | |

Fig. 13

| Position | Score | Score by Type |
|---|---|---|
| (74, 365) | 29 | Sedan : 21, Van : 8 |
| (20, 365) | 5 | Truck : 3, Bus : 2 |
| ⋮ | ⋮ | ⋮ |
| ● | ● | ● |

Fig. 16
Learning Image 10
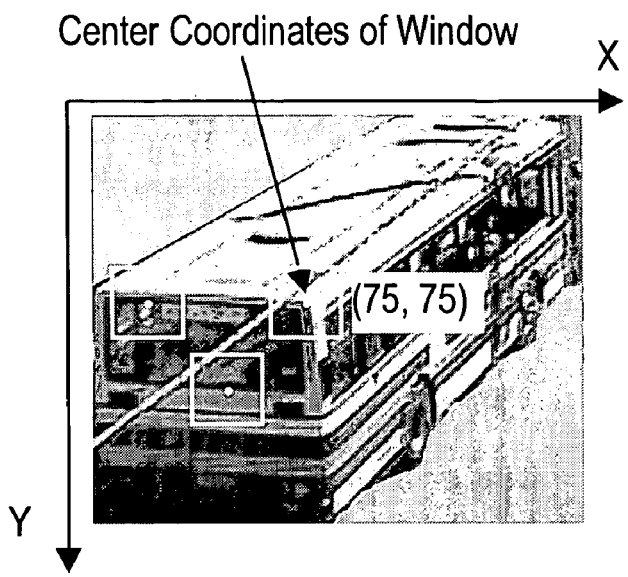
Learning Image 11
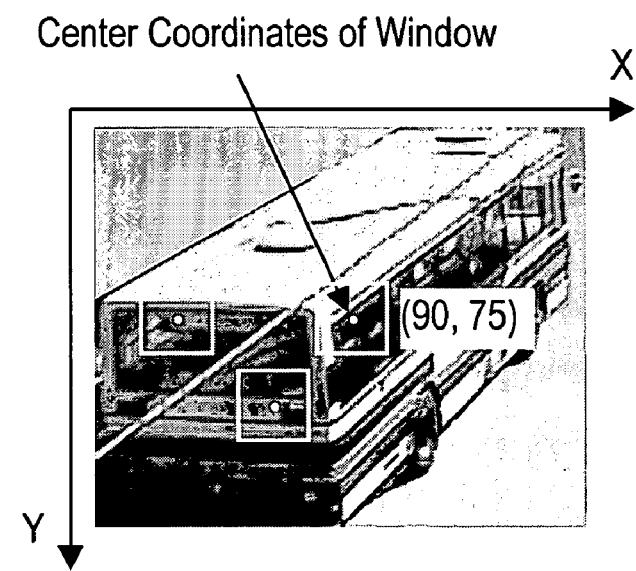

Fig. 21
Shape Identifier :
Shape Name : Sedan A
Image File Name : sedan1
Objective Area : (0, 0) - (147, 87)
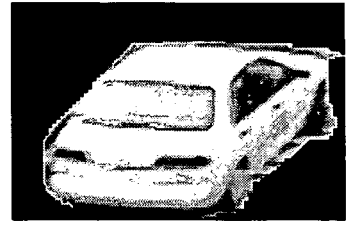
Shape Identifier :
Shape Name : Sedan A
Image File Name : sedan2
Objective Area : (25, 30) - (172, 117)
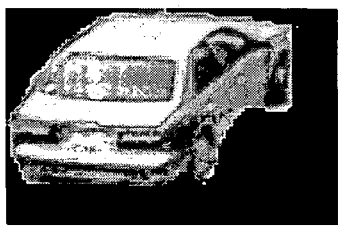
Shape Identifier :
Shape Name : Sedan A
Image File Name : sedan3
Objective Area : (0, 0) - (147, 87)
Fig. 22
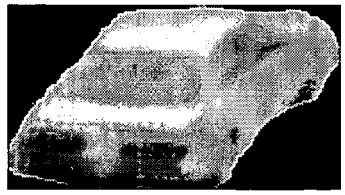
Shape Identifier :
Shape Name : Sedan A
Image File Name : average-sedan
Objective Area : (0, 0) - (147, 87)

Fig. 28
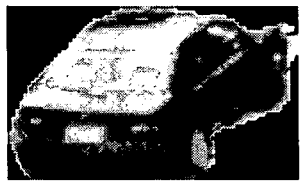
Shape Identifier :
| Shape Name | : Sedan A |
| Image File Name | : sedan1 |
| Objective Area | : (0, 0) - (147, 87) |
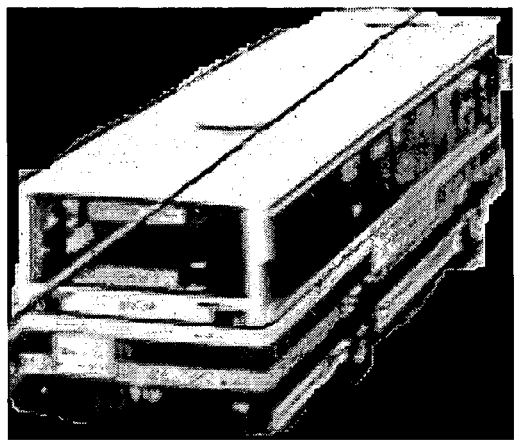  
Shape Identifier :
| Shape Name | : Bus Rear Portion |
| Image File Name | : bus1 |
| Objective Area | : (50, 100) - (197, 187) |

Shape Identifier :

| Shape Name | : Sedan A-3 |
| Image File Name | : sedan2 |
| Objective Area | : (59, 0) - (87, 21) |

Shape Identifier :

| Shape Name | : Sedan A-17 |
| Image File Name | : sedan2 |
| Objective Area | : (30, 66) - (58, 87) |

Fig. 34

| Position | Score |
|---|---|
| (74, 365) | 29 |
| (20, 365) | 5 |
| • | • |
| • | • |
| • | • |

APPARATUS AND METHOD FOR RECOGNIZING AN OBJECT AND DETERMINING ITS POSITION AND SHAPE

FIELD OF THE INVENTION

The present invention relates to an apparatus and a method for recognizing an object displayed in an input image and releasing data of its position and shape.

BACKGROUND OF THE INVENTION

One of conventional image recognizing apparatus is known as disclosed in the Japanese Patent of (Publication No. 9-21610).

FIG. 35 is a block diagram of a conventional image recognizing apparatus which comprises:
(a) image input unit 3511 for receiving an image of interest;
(b) model memory unit 3512 which stores local models of an object to be identified;
(c) matching process unit 3513 for matching each image segment of the input image with the local models;
(d) local data integrating unit 3514 for integrating and displaying, in probabilistic way, the position of the object to be identified in a parameter space together with the position of the image segment depending on the degree of the matching of each image segment of the input image with its local model; and
(e) object position determining unit 3515 for determining image segments with the highest probability from the parameter space to determine the position of the object to be identified in the input image.

The conventional image recognizing apparatus may carry out the recognizing operation with much difficulty as a number of similar local models of different models are increased.

Another conventional image recognizing apparatus is also known as disclosed in the Japanese Patent (Publication No. 6-215140).

FIG. 36 is a block diagram of the another conventional image recognizing apparatus which comprises:
(a) display 3601 for displaying an image;
(b) main controller 3602 for controlling operations of the entire system;
(c) internal memory 3603 for storing an operating program and the like;
(d) disk 3604 for storing a reference pattern;
(e) television camera 3605 for capturing an image of an object to be identified such as a product or a sample;
(f) image input unit 3606 for converting image data of the object captured by camera 3605 into a digital form;
(g) image rotating unit 3607 for positioning the object in a gradation image of the digital form to be faced in a given direction for each category;
(h) image data extracting unit 3608 for sampling the rotated image at a specific rate and extracting the gradation of each sampled image as feature data of the rotated image;
(i) dictionary generating unit 3609, having average vector calculator 3609A for calculating an average vector of the images of each category from the feature data, for determining a dictionary (a list of reference patterns) of the average vectors;
(j) identifying unit 3610 having vector distance comparator 3610A for calculating a vector of an object of an unknown category and for extracting, from the dictionary generating unit 3609, one of the average vectors which is closest to the calculated vector to identify the object on the unknown category; and
(j) parameter setting unit 3611 for optimizing the parameters for image input 3606, the image rotating unit 3607, image data extracting unit 3608, and identifying unit 3610 in each category.

The another conventional image recognizing apparatus may hardly carry out the recognizing operation in case that the images of objects which are identical in the shape but different in the gradation are grouped in one category for recognizing and classifying the objects by shape. Since similar gradation images are grouped into one category, a total number of categories increases thus requiring more time for the operation.

SUMMARY OF THE INVENTION

A first object of the present invention is to estimate the position and the type of an object to be identified in an input image at high accuracy even when local models of different types are very similar.

An image recognizing apparatus according to the present invention comprises:
(a) image input means for inputting an image;
(b) image dividing means for dividing the image received from the image input means into input local-segments;
(c) similar window extracting means for extracting a learning-local-segment which is similar to each input local-segment received from the image dividing means;
(d) object position estimating means for estimating a position of an object to be identified in the input image from the coordinates of the input window and the coordinates of the learning-window received from the similar window extracting means; and
(e) counting means for counting a pair of the learning window and the input window for each position which is estimated from the learning window and the input window by the object position estimating means.

The operation of the image recognizing apparatus having the above arrangement of the present invention includes:
(1) extracting a learning window which is similar to a input window in the input image;
(2) estimating, in the input image, a position of a model in a learning image from the coordinates of the learning window in the learning image and the coordinates of the corresponding input window in the input image; and
(3) counting a pair of the learning window and the input window for each position estimated from the learning window and the input window. Consequently, when the counted number is greater than a predetermined number, it is judged that the object of a type expressed with the learning image is present in the input image, and the position of the object can be estimated at high accuracy.

A second object of the present invention is to quickly recognize a shape of an object in an image and determine its position while the images of objects which are identical in the shape but different in the gradation are grouped into one category.

Another image recognizing apparatus according to the present invention comprises:
(a) an image database for preliminarily storing a shape identifier specifying a shape of an object to be identified and images of the object having the shape;
(b) model generating means for preliminarily extracting feature data of the shape from the model images;

(c) a shape database for preliminarily storing the feature data of the shape with its shape identifier;

(d) an image input unit for inputting an input image to be examined;

(e) an image cutout unit for cutting out an image segment from the input image as a partial image;

(f) shape classifying means for determining whether or not the object of the shape is present in the image segment by comparing the image segment with the feature data of the shape; and (g) an output unit for releasing, if there is an object having a shape which coincides with a shape in the input image, data about the shape of the object determined by the shape classifying means and about the position of the shape of the object in the input image.

The another image recognizing apparatus according to the present invention allows the feature data of the shape to be preliminarily extracted from many model images and to be compared with the input image. Accordingly, the another image recognizing apparatus can quickly examine whether or not the object is present in the input image from less amounts of data and, when so, readily provide the position and the shape of the object.

BRIEF DESCRIPTION OF THE DRAWINGS

FIG. 6 illustrates an example of a combination of an input window and a learning window released from similar window extracting means of Embodiment 1;

FIG. 7 illustrates an example of a resultant output of counting means;

FIG. 11 illustrates examples of same-type window data stored in a same-type window database of Embodiment 2;

FIG. 12 illustrates an example of a combination of an input window and a learning window released from similar window extracting means of Embodiment 2;

FIG. 13 illustrates an example of a resultant output of counting means of Embodiment 2;

FIG. 16 illustrates examples of learning image data stored in a learning image database for type X of Embodiment 3;

FIG. 21 illustrates examples of model images and their shape identifiers stored in an image database of Embodiment 4;

FIG. 22 illustrates an example of an average model image and its shape identifier stored in a shape database of Embodiment 4;

FIG. 28 illustrates examples of model images and their shape identifiers stored in an image database of Embodiment 5;

FIG. 34 illustrates an example of a resultant output of a counting unit of Embodiment 6;

DETAILED DESCRIPTION OF THE PREFERRED EMBODIMENTS

Exemplary embodiments of the present invention will be described in detail referring to FIGS. 1 to 34.

Embodiment 1

Figure 1:
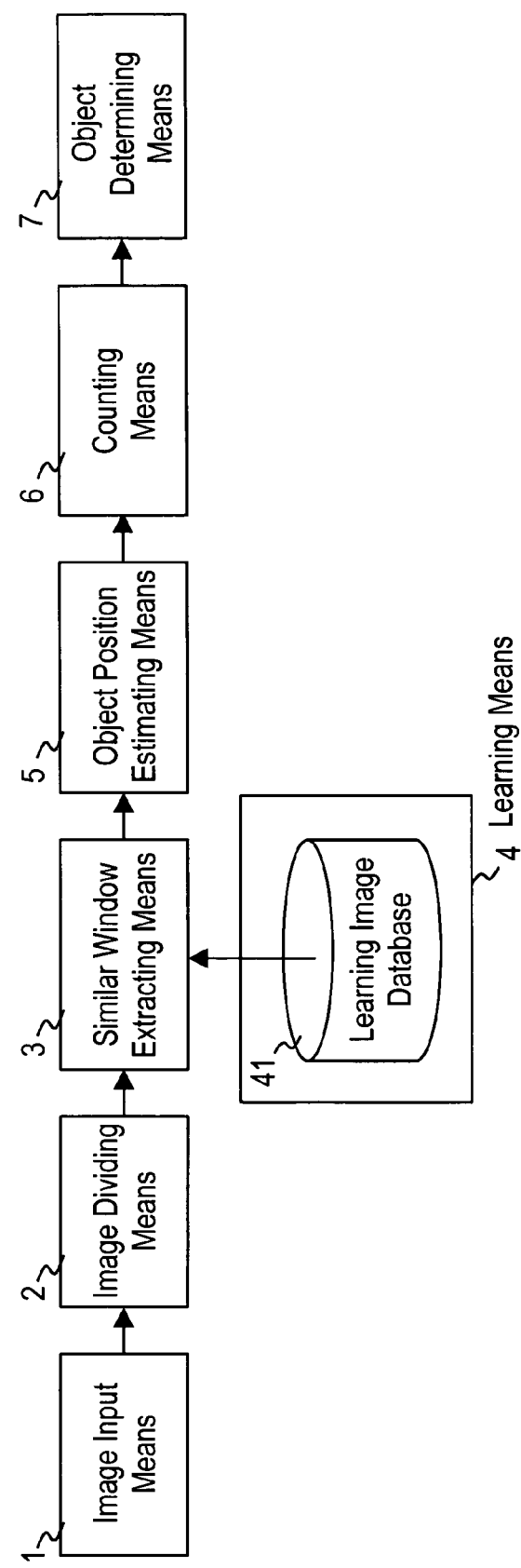
FIG. 1 is a block diagram of an image recognizing apparatus according to Embodiment 1 of the present invention.

FIG. 1 is a block diagram of an image recognizing apparatus according to Embodiment 1 of the present invention. Image input means 1 receives image data of an object to be identified. Image dividing means 2 divides the image received by image input means 1 into input windows as local-segments. Similar window extracting means 3 retrieves, from a database, the data of a learning window which is similar to the local window from image dividing means 2, and releases the learning window with its corresponding local window as the learning-local-segments. Learning means 4 preliminarily generates an image model of the object to be identified. Learning image database 41 divides a learning image, which is a model image of an object to be identified, into windows having the size as the local window from image dividing means 2 and stores them as learning windows. Object position estimating means 5 calculates the position of the object in the input image from the position of the learning window in the learning image retrieved by similar window extracting means 3 and the position of the corresponding local window in the input image. Counting means 6 counts a pair of the local window, which is received from object position estimating means 5, and the learning window for each position which is estimated from the window and the learning window.

Object determining means 7 judges whether the object is present or not in the input image and, when so, determines the position of the object in the input image.

Figure 2:
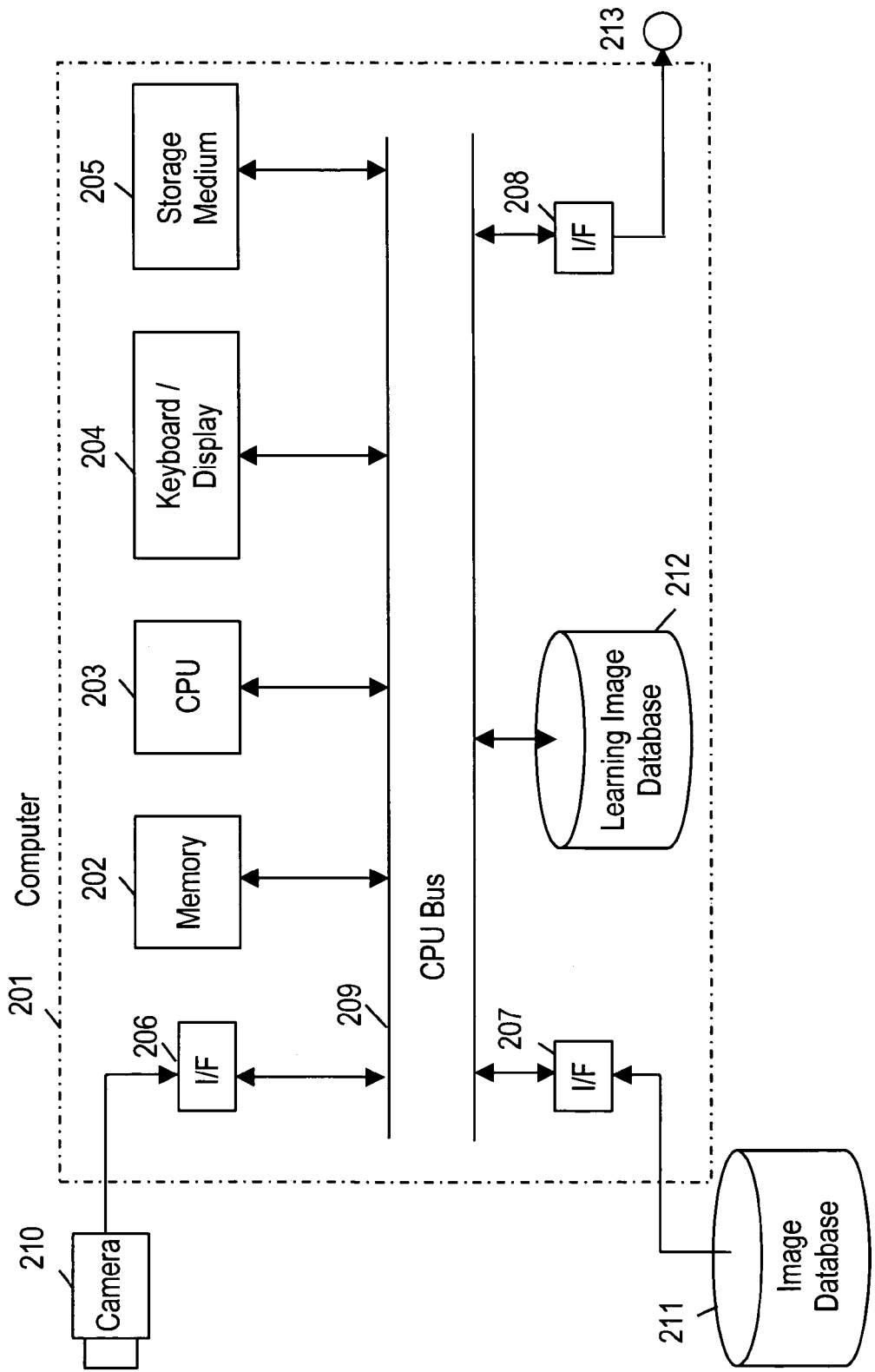
FIG. 2 is a block diagram of the image recognizing apparatus of Embodiment 1 implemented by a computer.

FIG. 2 is a block diagram showing an image recognizing apparatus implemented by a computer. The image recognizing apparatus comprises computer 201, CPU 202, memory 203, keyboard and display 204, storage medium unit 205 such as an FD, a PD, or an MO drive for holding an image recognizing program, interface (I/F) units 206, 207, and 208, CPU bus 209, camera 210 for capturing an image, image database 211 for supplying pre-stored image data, learning image database 212 for dividing the learning image, which is the model image of each object of interest, into a window-sized segment and storing them as learning windows, and output terminal 213 for delivering the type and position of the object via the I/F units.

Figure 3:
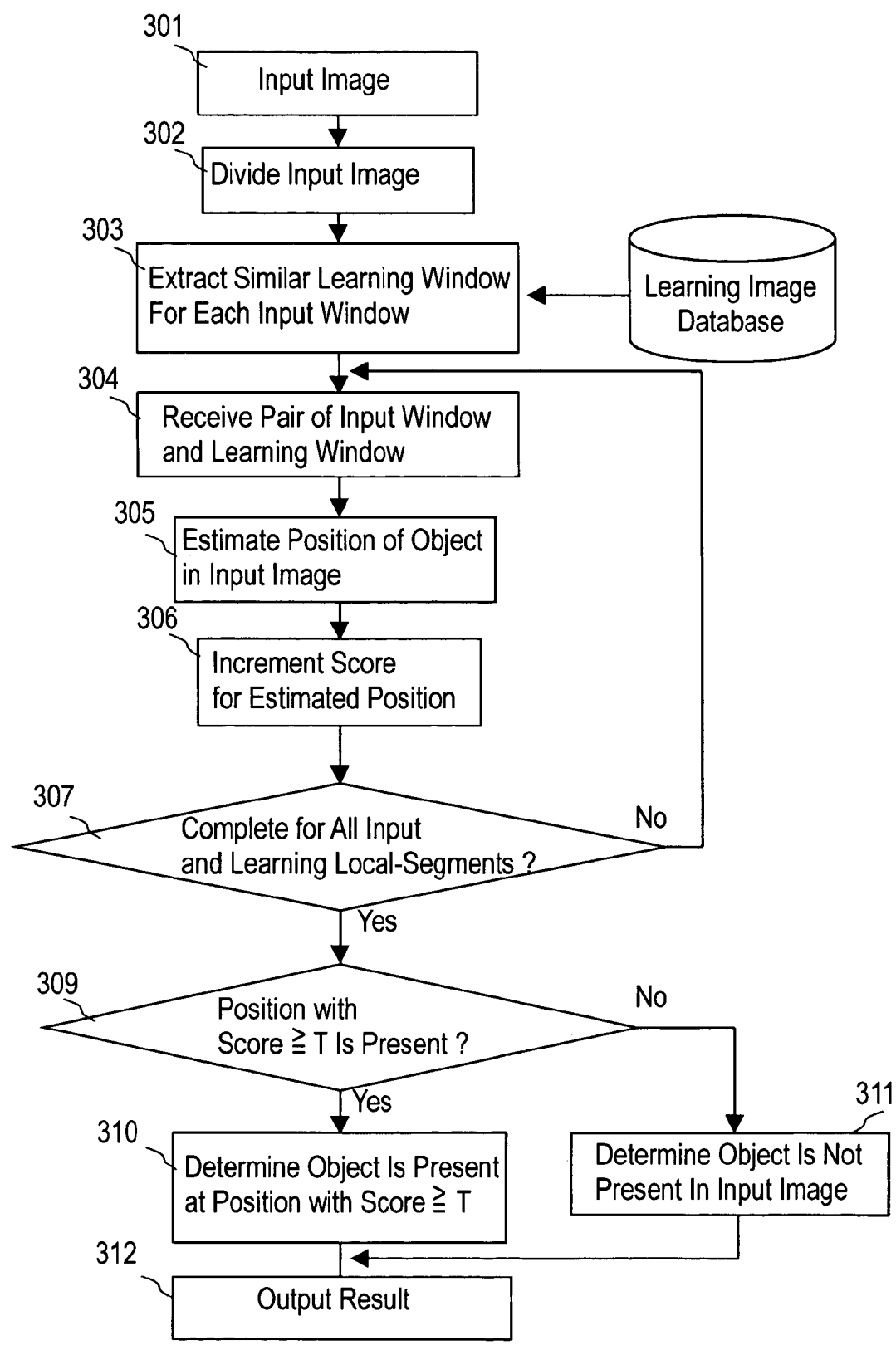
FIG. 3 is a flowchart showing a procedure in Embodiment 1.
Figure 4:
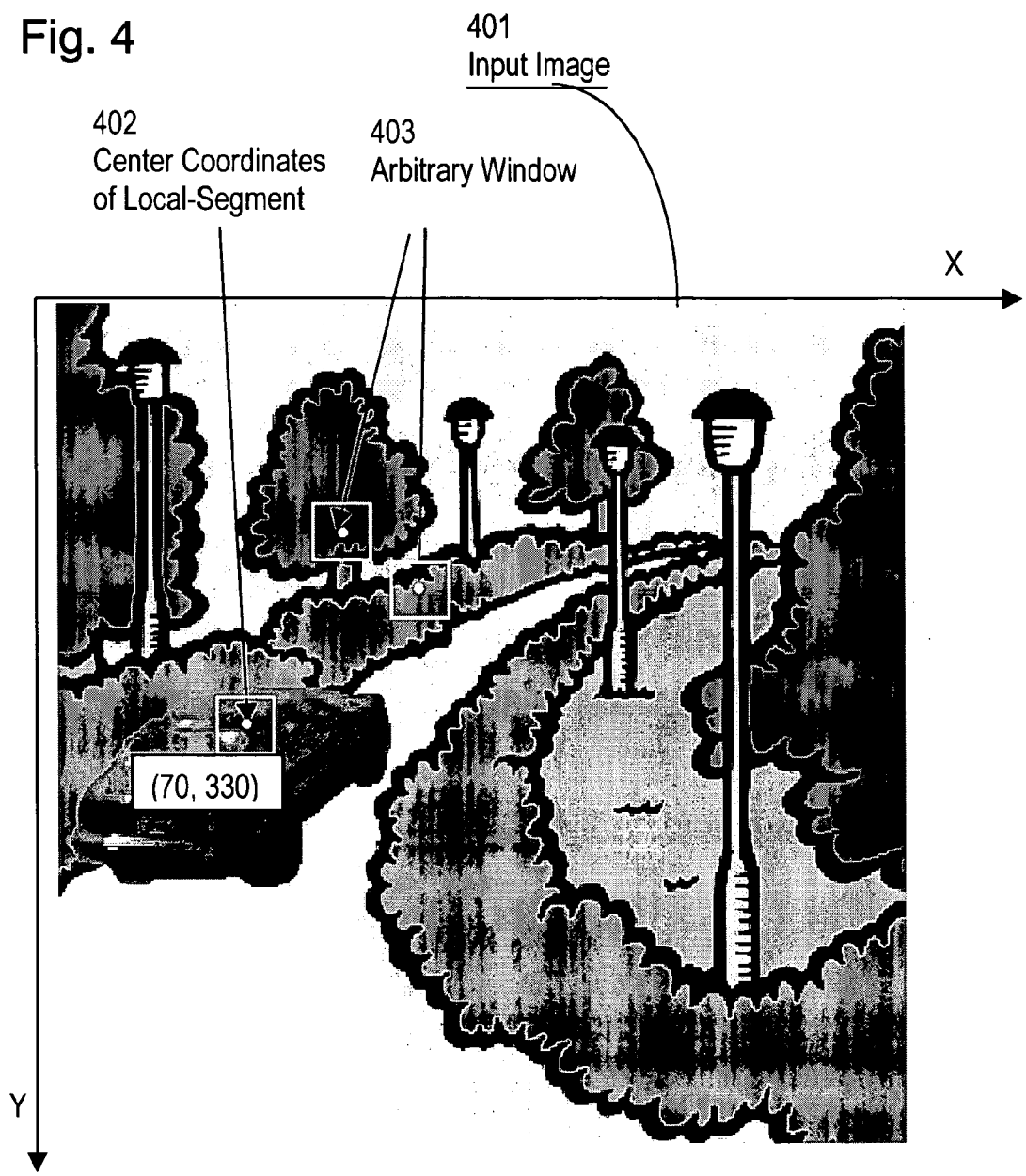
FIG. 4 illustrates an example of input image in Embodiment 1.

The operation of the image recognizing apparatus having the above arrangement is now explained referring to the flowchart shown in FIG. 3. FIG. 4 illustrates an example of the input image, FIG. 5 illustrates examples of the learning image, FIG. 6 illustrates an example of the data output of similar window extracting means 3, and FIG. 7 illustrates an example of the resultant output of counting means 6.

Figure 5:
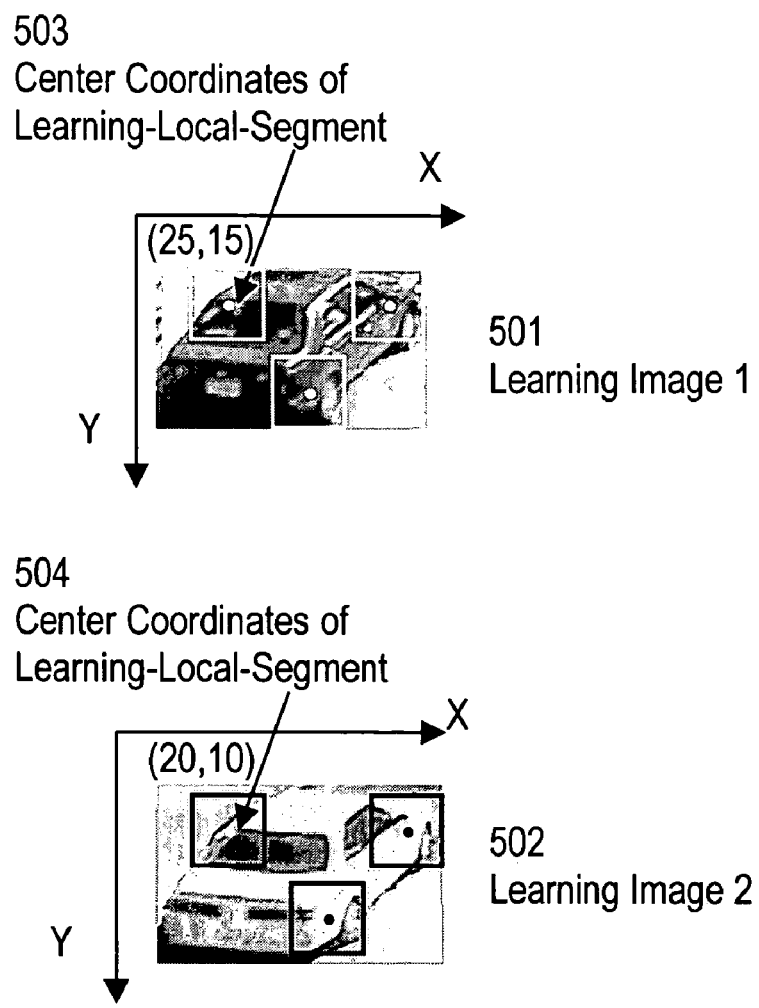
FIG. 5 illustrates examples of learning image data stored in a learning image database of Embodiment 1.

In learning image database 41 (learning image database 212), the same window-size of images of an object to be identified as the input window, shown in FIG. 5, are stored as image data of a learning window together with the coordinate at the center thereof. Learning images 1 and 2 shown in FIG. 5 are provided for identifying a sedan-type vehicle in the shown direction and size.

Image input means 1, which is camera 210 or image database 211, receives an image data of interest (Step 301). Image dividing means 2 retrieves an input window data of a predetermined size from the received image through moving and locating a local window and releases the input local window data with the coordinate at the center thereof (Step 302).

Similar window extracting means 3 calculates a difference between the input local window data in the input image received from image dividing means 2 and the corresponding learning window data stored in learning image database 41 (learning image database 212) (e.g. a sum of squares of a pixel data difference or an accumulation of the absolutes of a pixel data difference) and picks up one of the learning window data with the minimum difference. Picking up the most similar learning window to every input local window in the input image from learning image database 41, similar window extracting means 3 releases the coordinates at the center of the learning window and the coordinates at the center of the corresponding input local window in a combination as shown in FIG. 6 (Step 303).

Object position estimating means 5, upon receiving a pair of the coordinate data of the learning window and the coordinate data of the input local window (Step 304), estimates the position of the object in the input image (more specifically, the coordinates at the upper left corner of a rectangular which circumscribes the object, i.e., at the origin of the learning image shown in FIG. 5) (Step 305). Input the coordinates ($\alpha$, $\beta$) of the input local window shown in FIG. 6 and the coordinates ($\gamma$, $\gamma$) of the learning window, object position estimating means 5 releases the position of the object is expressed as ($\alpha-\gamma$, $\beta-\theta$).

Counting means 6, when receiving the coordinates ($\alpha-\gamma$, $\beta-\theta$) calculated at Step 305, increments the score for the coordinates by one (Step 306). As a procedure from Step 304 to Step 306 has been repeated for all the pairs of the input local window and the learning window (Step 307), counting means 6 releases a sum data including the coordinates at the position and the score as shown in FIG. 7.

Object image determining means 7 then judges whether or not the score for each set of the coordinates is greater than certain value T (Step 309). When so, it is judged that the object to be identified is present in the input image (Step 310). If none of the scores is greater than certain value T, it is determined that the object to be identified is not present in the input image (Step 311). The coordinates at the position of the object are then passed through I/F unit 208 and released from output terminal 213 (Step 312).

Embodiment 2

Figure 8:
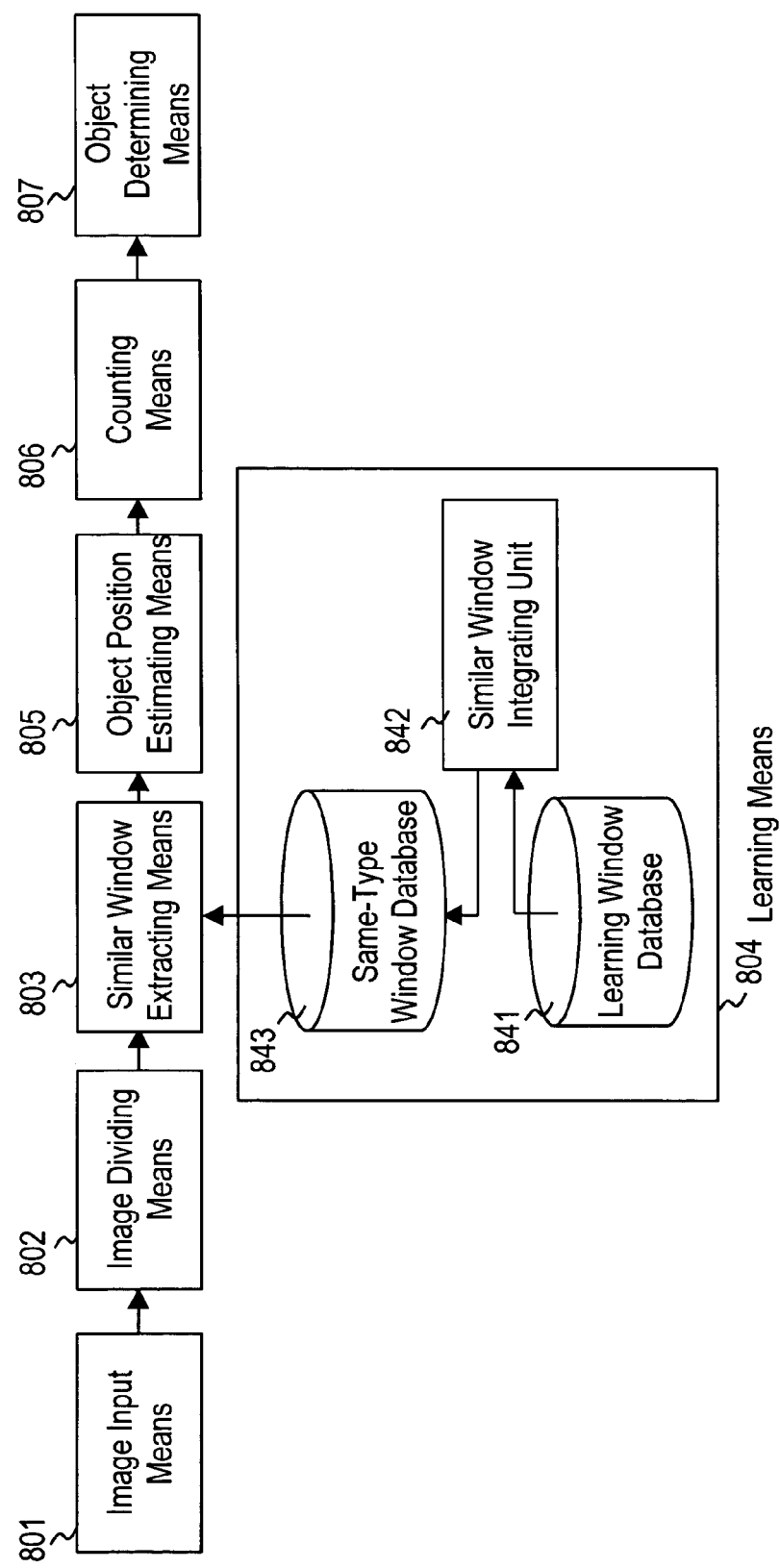
FIG. 8 is a block diagram of an image recognizing apparatus according to Embodiment 2 of the present invention.

FIG. 8 is a block diagram of an image recognizing apparatus according to Embodiment 2 of the present invention. Image input means 801 receives image data of an object to be identified. image dividing means 802 divides the image data supplied from the image input means 801 into an input window as local-segments and releases the input window data. Similar window extracting means 803 retrieves learning window (learning-local-segment) data, which is similar to the input local window data divided by image dividing means 802, from a database and releases it together with the corresponding input local window data. Learning means 804 preliminarily generates a model of the object to be identified. Learning image database 841 divides a learning image, which represents the model of the object to be identified, into learning windows having the same size as the input windows generated by image dividing means 802 and stores the learning windows. Similar window integrating unit 842 makes a group of the learning windows which are stored in learning image database 841 and similar to each other and releases the image data of a representative learning window of the group together with the coordinates of each of the other learning windows in the group. Integrating unit 842 also releases the coordinates and the image data of a learning window which is dissimilar to the other learning windows. Same-type window database 843 stores the coordinates and the image data of the representative learning window of each group received from similar window integrating unit 842. Object position estimating means 805 calculates the position of the object in the input image from the position of the learning window in the learning image retrieved by similar window extracting means 803 and the position of its corresponding input local window in the input image. Counting means 806 counts a pair of the input local window and the learning window for each position which is estimated from the input window and the learning window by object position estimating means, when receiving a result of the counting operation of counting means 806, judges whether or not the object is present in the input image and, if so, determines the position of the object.

Figure 9:
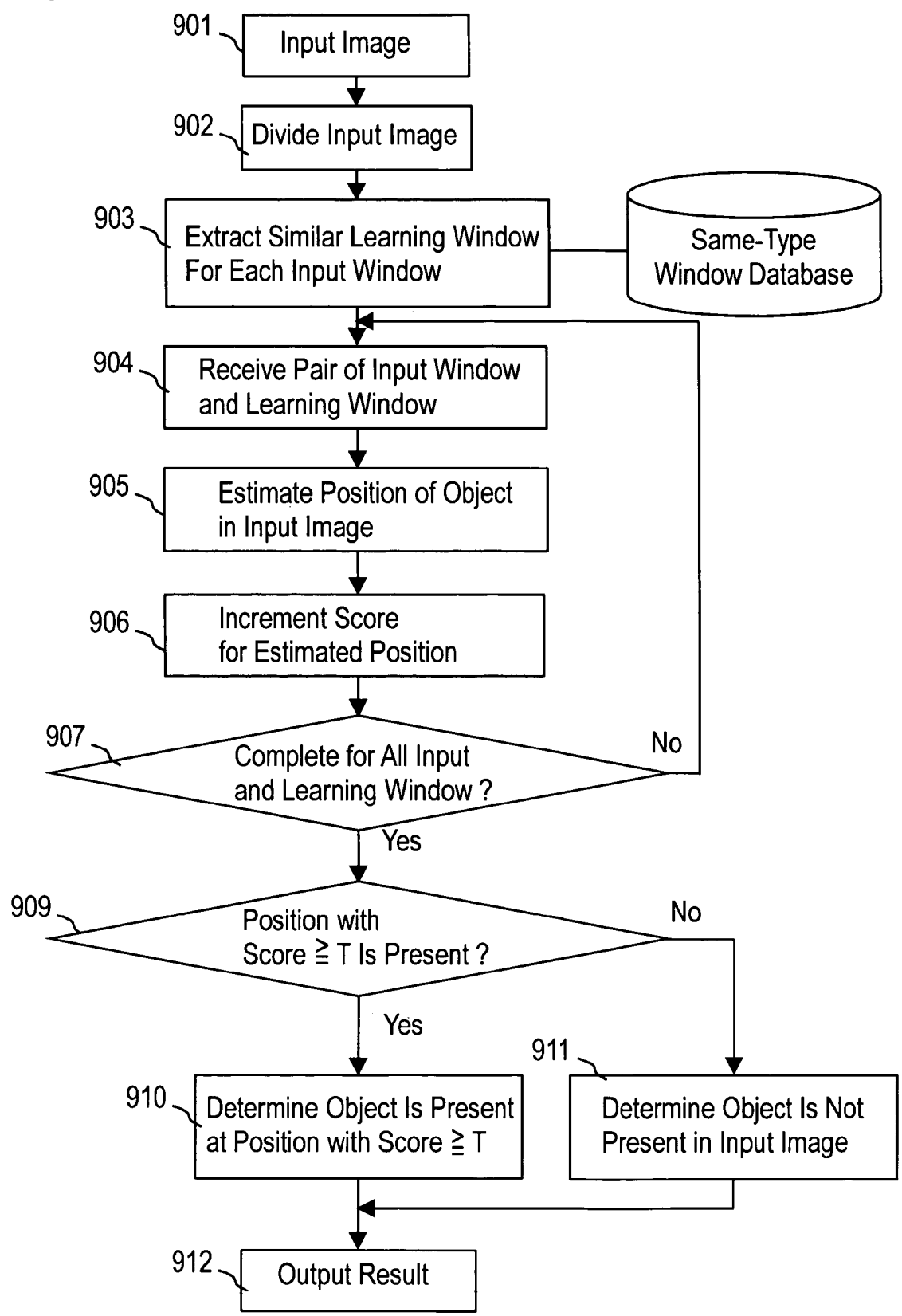
FIG. 9 is a flowchart showing a procedure in Embodiment 2.

The operation of the image recognizing apparatus having the above arrangement is now explained referring to the flowchart shown in FIG. 9.

Figure 10:
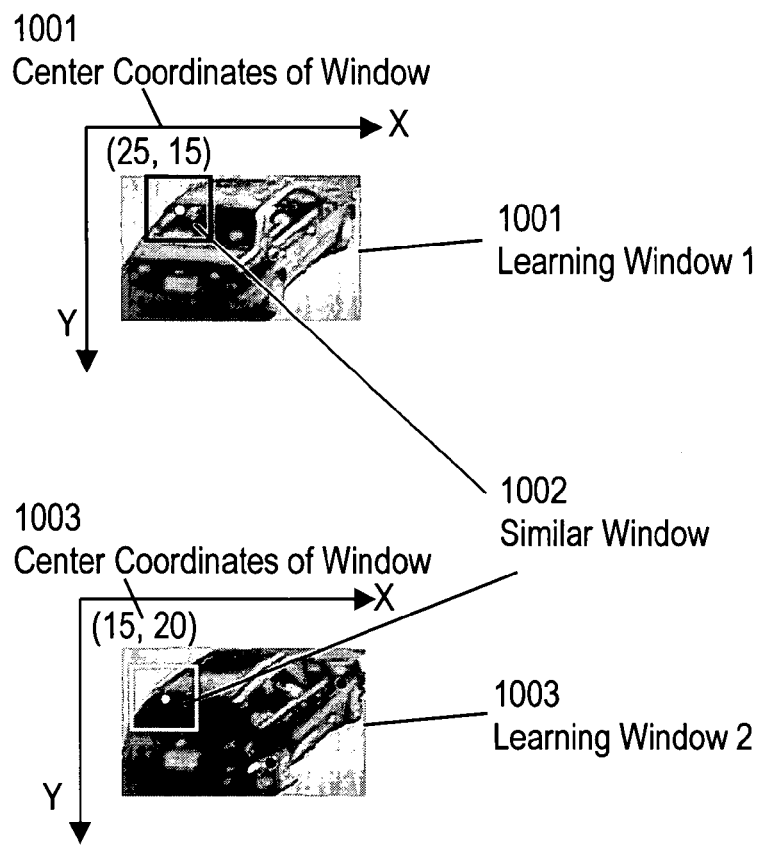
FIG. 10 illustrates examples of same-type images stored in an image database of Embodiment 2.

While the input image is shown in FIG. 4 and the learning images are shown in FIG. 5, FIG. 10 illustrates similar windows stored in similar window database 841, FIG. 11 illustrates same-type window data, such as the image data of the representative learning window 1101, stored in same-type window database 843, FIG. 12 illustrates a data output of similar window extracting means 803, and FIG. 13 illustrates a resultant output of counting means 806.

The input image of each object to be identified is divided into learning windows having the same size as the input local windows of the input image shown in FIG. 5, and each learning window data is stored together with its window number and the coordinates at the center thereof in learning image database 841. FIG. 5 shows such two learning windows as learning images 1 and 2 for identifying a sedan-type vehicle in the shown direction and size. Same-type window database 843 stores the image data of a representative learning window of each group of the similar windows, such as shown in FIG. 10, and the coordinates of each of the other learning windows in the group, which are retrieved from learning image database 841 by similar window integrating unit 842 as shown in FIG. 11.

Image input means 801 receives image data of interest (Step 901). Image dividing means 802 extracts local windows of a predetermined size from the image data as an input windows and releases their data together with the coordinates at the center thereof (Step 902).

Similar window extracting means 803 calculates a difference between the input local window received from image dividing means 802 and the representative learning window of each group stored in same-type window database 843 (e.g. a sum of the squares of a pixel data difference or an accumulation of the absolutes of a pixel data difference) and picks up a group having the minimum difference from the groups. As picking up a group of the learning windows which are most similar to the corresponding input local windows, similar window extracting means 803 recognizes that all the learning windows in the group are similar (or corresponding) to the input local window. Extracting means 803 retrieves the coordinates of the representative learning local window from same-type window database 843 and releases them together with the coordinates at the center of the input window and those at the center of the learning window and the type of a vehicle attributed to the learning window as shown in FIG. 12 (Step 903).

Object position estimating means 805, upon receiving a pair of the coordinate data of the learning window and the coordinate data of the input local window (Step 904), estimates the position of the object in the input image, and more specifically, the coordinates at the upper left corner of a rectangular which circumscribes the object (i.e., the origin in the learning image shown in FIG. 5), and releases its data together with the type of a vehicle (Step 905). Upon Input the coordinates of the input local window ($\alpha$, $\beta$) and the coordinates of the learning window ($\gamma$, $\theta$) as shown in FIG. 12, object position estimating means 805 releases the position of the object ($\alpha-\gamma$, $\beta-\theta$).

Counting means 806, when receiving the coordinates ($\alpha-\gamma$, $\beta-\theta$) calculated at Step 905 together with data of the type of a vehicle, increments both the score for the coordinates and the score for the type of a vehicle by one (Step 906).

It is then examined whether or not the procedure from Step 904 to Step 906 is completed for all the pairs of the input local window and the learning window (Step 907), and when so, counting means 806 delivers the coordinates of the position, the score for it, and the score for each type of a vehicle in a combination, shown in FIG. 13, to object image determining means 807.

Object image determining means 807 then determines whether or not the score for each set of the coordinates is greater than certain value T (Step 909). When so, the coordinates at each position of which score is greater than T and the type of a vehicle of which score is higher than any other scores is released (Step 910). If none of the scores is greater than certain value T, determining means 807 determines the object to be identified is not present in the input image (Step 911). The coordinates at the position and the type of the vehicle of the object are then released from the output terminal 213 through I/F unit 208 (Step 912).

Embodiment 3

Figure 14:
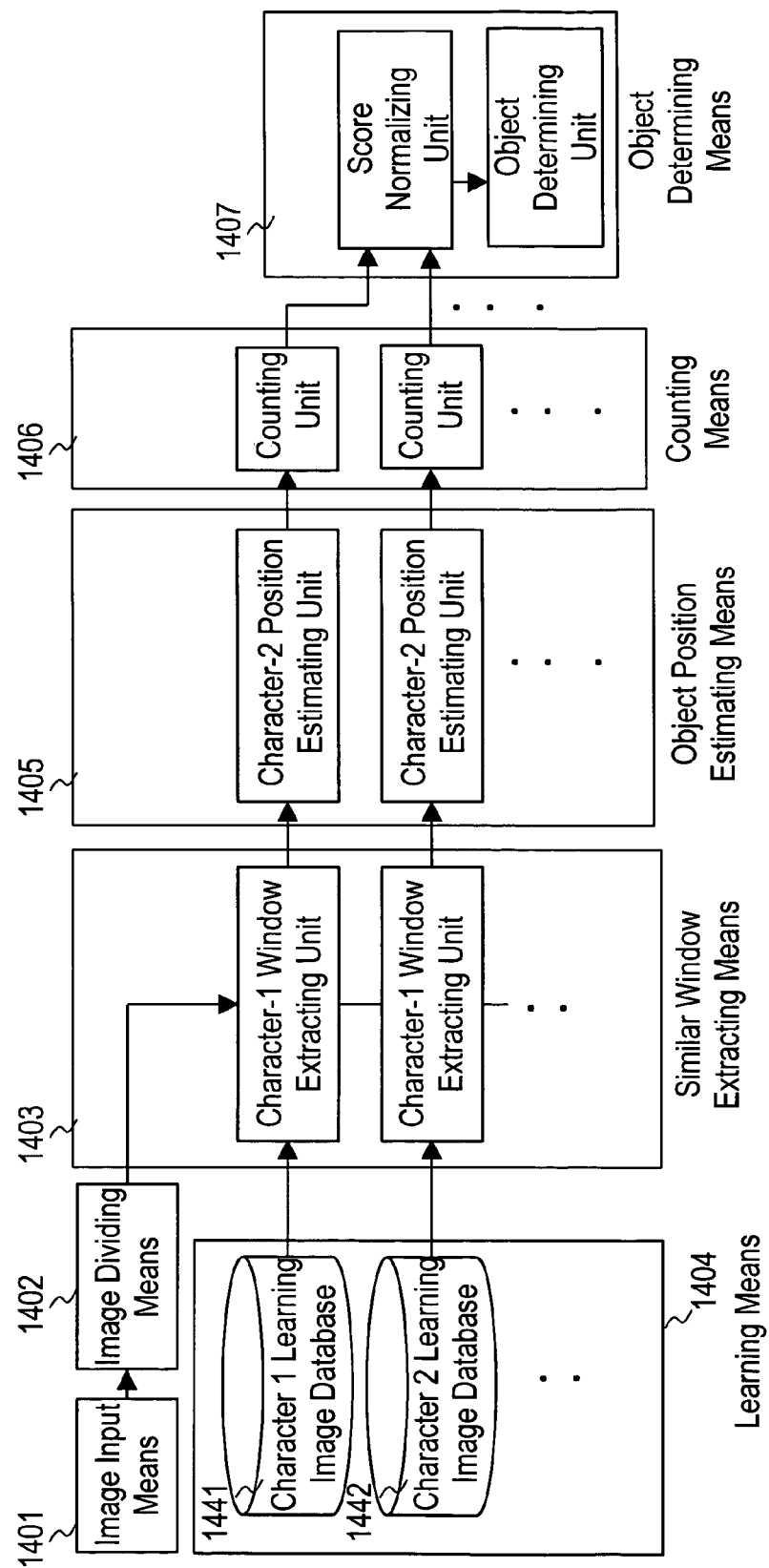
FIG. 14 is a block diagram of an image recognizing apparatus according to Embodiment 3 of the present invention.

FIG. 14 is a block diagram of an image recognizing apparatus according to Embodiment 3 of the present invention. Image input means 1401 receives image data of an object to be identified. Image dividing means 1402 divides the image data supplied from image input means 1401 into input windows as local-segments and releases the input windows. Similar window extracting means 1403 retrieves one similar learning window (learning-local-segment) to each input local window released by image dividing means 1402 from each learning database and releases it together with the corresponding input local window data.

Learning means 1404 preliminarily generates a model of the object which corresponds to different categories to be identified. By-character learning image databases 1441, 1442, . . . divide a learning image which represents the model of the object to be identified into learning windows having the same size as the input windows determined by image dividing means 1402, and store the learning windows for each character Object position estimating means 1405 calculates the position of the object in the input image from the position of the learning window in the learning image retrieved by similar window extracting means 1403 for each character and the position of its corresponding input local window in the input image. Counting means 1406 counts a pair of the input local window and the learning window for each position which is estimated from the input window and the learning window by object position estimating means 1405 for each character. Object determining means 1407, when receiving results of the counting operation of counting means 1406 for each character, judges whether or not the object is present in the input image, and if so, determines the position of the object.

Figure 15:
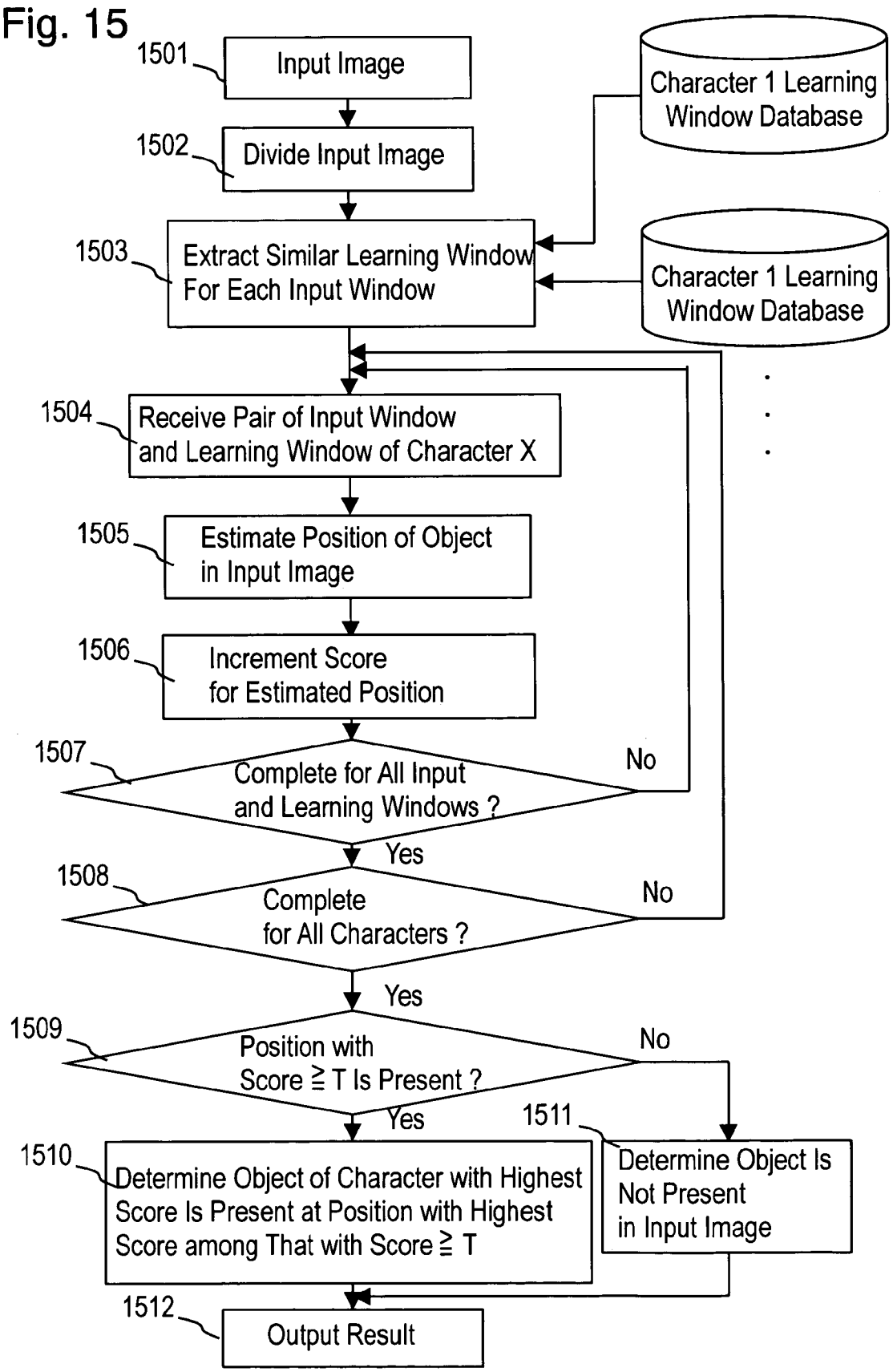
FIG. 15 is a flowchart showing a procedure in Embodiment 3.

The operation of the image recognizing apparatus having the above arrangement is now explained referring to the flowchart shown in FIG. 15.

An input image is shown in FIG. 4, a learning image of character 1 is shown in FIG. 5, an example of output data of similar window extracting means 1403 is shown in FIG. 6, and the learning image of character 2 is shown in FIG. 16.

In each of by-character learning image databases 1441, 1442, . . . in learning means 1404, the image of the object to be identified of each character is divided into learning windows having the same size as the input windows of the input image shown in FIG. 5, and the learning windows are stored together with the window numbers and the coordinates at the center thereof. FIG. 5 shows such learning windows stored in character-1 learning image database 1441. Two learning images 1 and 2 are for identifying sedan-type vehicles in the shown direction and size. The learning images shown in FIG. 16 are stored in character 2 learning image database 1442 for identifying buses in the same location and direction as shown in FIG. 5.

Image Input means 1401 receives image data of interest (Step 1501). Image dividing means 1402 extracts a input windows from the image data through moving and locating a window of predetermined size and releases the input window together with the coordinates at the center thereof (Step 1502).

Similar window extracting means 1403 calculates a difference between the input local window of the input image received from image dividing means 1402 and its corresponding learning window stored in each by-character learning image database in learning means 1404 (e.g. a sum of the squares of a pixel data difference or an accumulation of the absolutes of a pixel data difference), and picks up the learning window having the minimum difference in each learning image database. Similar window extracting means 1403 picks up the most similar learning window for each input window from learning means 1404. Extracting means 1403 retrieves and releases the coordinates at the center of the learning window together with the coordinates at the center of the corresponding input window for each character as shown in FIG. 6 (Step 1503).

Object position estimating means 1405, upon receiving a pair of the coordinate data of the learning window and the coordinate data of the input local window (Step 1504), estimates the position of the object in the input image, e.g., the coordinates at the upper left corner of the rectangular which circumscribes the object (i.e., the origin in the learning image shown in FIG. 5) (Step 1505). Upon input the coordinates ($\alpha$, $\beta$) of the input local window and the coordinates ($\gamma$, $\theta$) of the learning window as shown in FIG. 6, object position estimating means 1405 releases the position ($\alpha-\gamma$, $\beta-\theta$) of the object.

Counting means 1406, when receiving the coordinates ($\alpha-\gamma$, $\beta-\theta$) calculated at Step 1505, increments the score for the coordinates of the window by one for each character (Step 1506).

It is then examined whether or not the procedure from Step 1504 to Step 1506 is completed for all the pairs of the input local window and the learning window for one character (Step 1507). The same procedure from Step 1504 to Step 1506 is repeated for another character. When the procedure has been completed for all the learning windows and the input local windows for all characters, counting means 1406 delivers the coordinates of the position and the score in a combination for each character shown in FIG. 7 to object image determining means 1407 (Step 1508).

Object image determining means 1407 then determines whether or not the score for each set of the coordinates is greater than certain value T (Step 1509). When object image determining means 1407 determines that the object of a particular character of which score is greater than T and higher than any other scores is present in the input image, the coordinates at the position of the object are released together with data of the character (Step 1510). If none of the scores is greater than certain value T, determining means 1407 determines that the object to be identified is not present in the input image (Step 1511). The coordinates at the position and the type of the object are released from output terminal 213 through I/F unit 208 (Step 1512).

Embodiment 4

Figure 17:
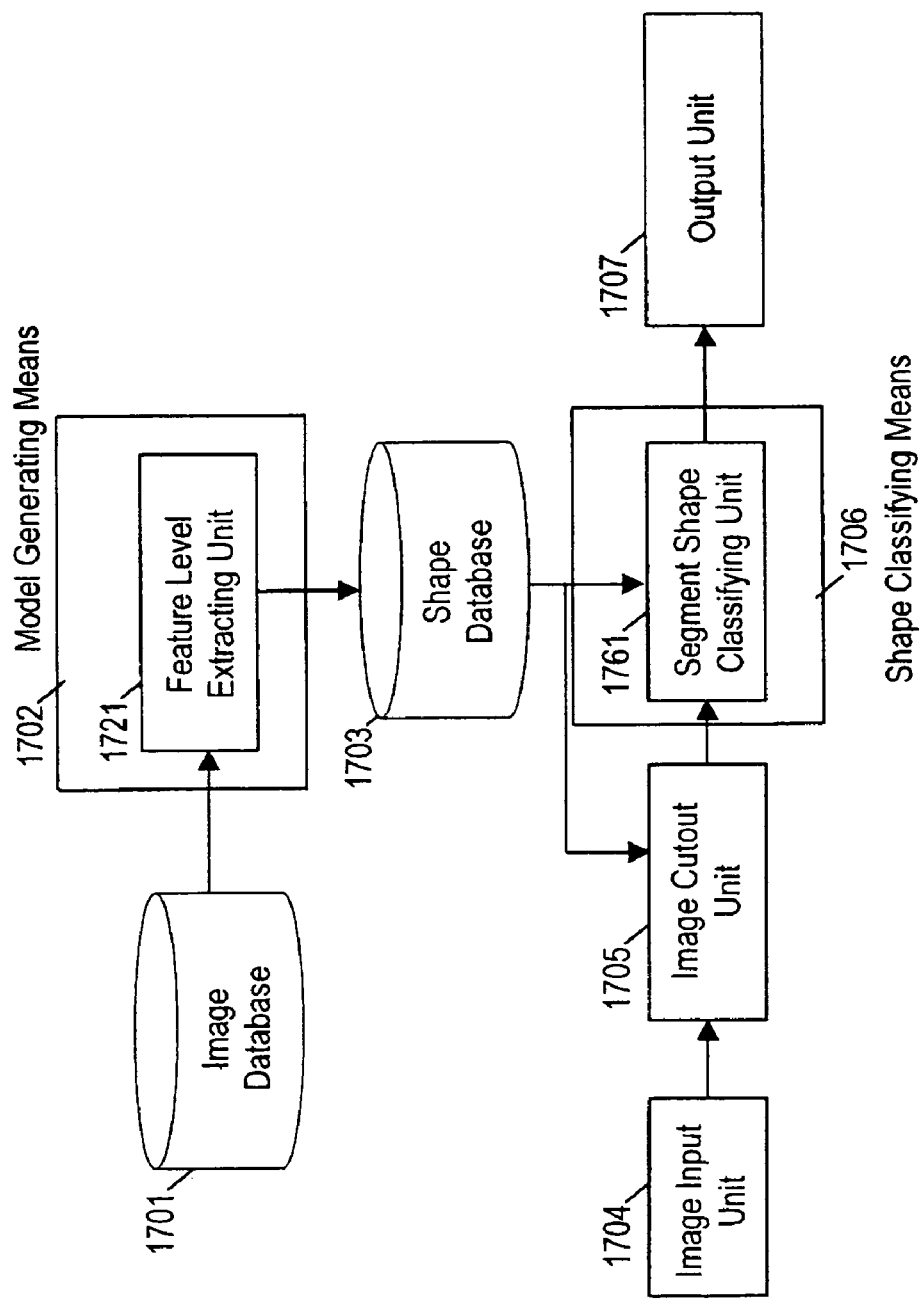
FIG. 17 is a block diagram of an image recognizing apparatus according to Embodiment 4 of the present invention.

FIG. 17 is a block diagram of an image recognizing apparatus according to Embodiment 4 of the present invention.

Image database 1701 stores gradation images of objects having a common shape to be identified, and each gradation image is accompanied with a shape identifier including a shape name, a file name, and the coordinates at the upper left and the lower right corners of a rectangular which circumscribes the object in an image. Model generating means 1702 retrieves all the gradation images of each shape to be identified from image database 1701 and extracts its feature. Feature level extracting unit 1721 calculates an average and a variance of each pixel in the rectangular which circumscribes the object of each shape in all the gradation images received from image database 1701 and releases them together with the corresponding shape identifier. Shape database 1703 receives and stores each set of the average, the variance, and the shape identifier of each shape from feature level extracting unit 1721. Image input unit 1704 inputs an image to be determined whether the object having a shape to be identified is present therein. Image cutout unit 1705 receives the shape identifier from shape database 1703, and cuts out an image segment having the same size as the shape to be identified from the input image. Shape classifying means 1706 examines whether or not an object of the shape to be identified is present in the image segment received from image cutout unit 1705. Segment shape classifying unit 1761 compares the image segment received from image cutout unit 1705 with a shape feature retrieved from shape database 1703 for determining that a shape in the image segment coincides with the shape feature. Output unit 1707, when receiving an output of the shape classifying means 1706 indicating that the object of the shape to be identified is present in the image segment, directs a display to display the shape and the position of the object in the input image.

Figure 18:
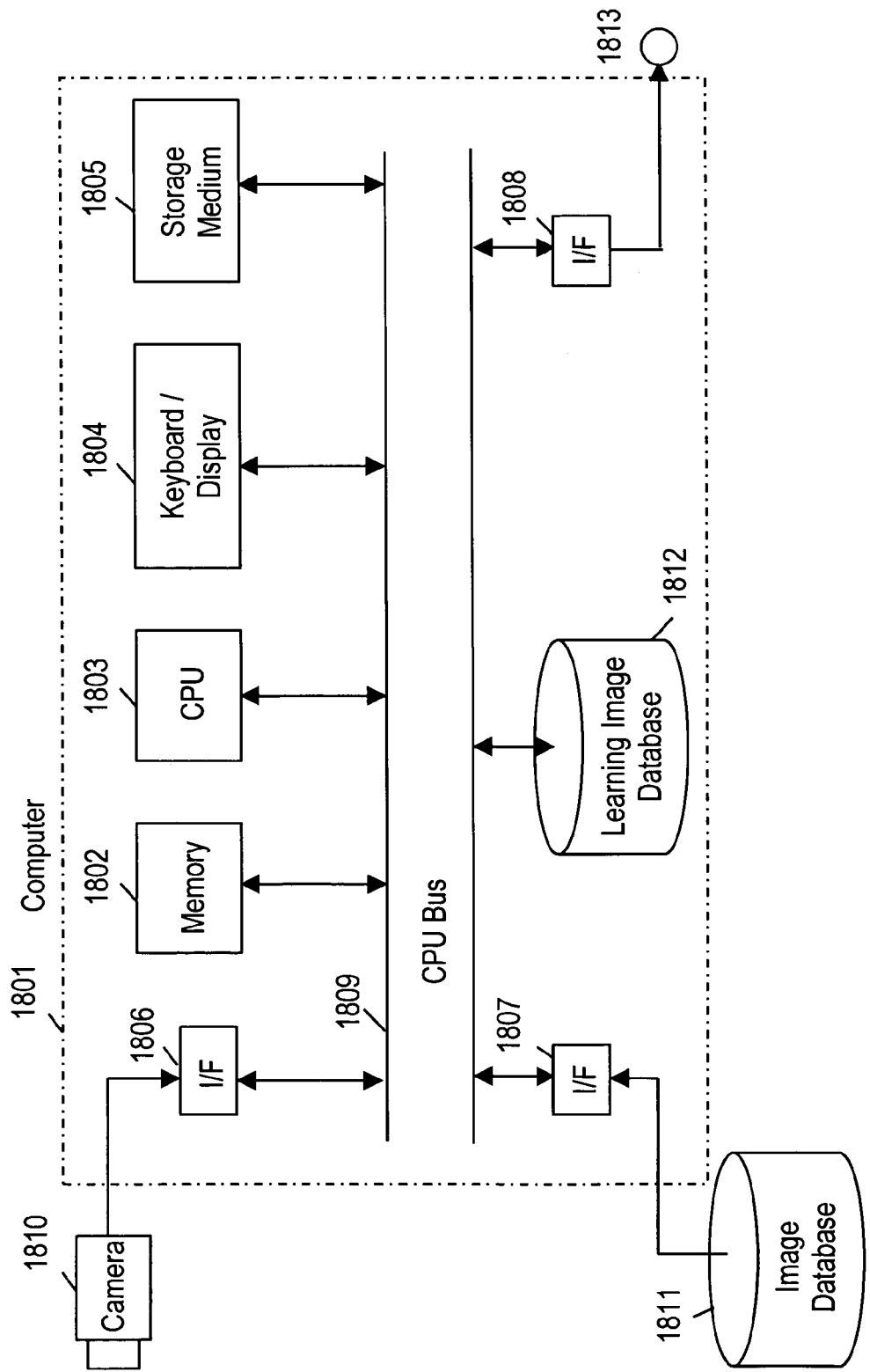
FIG. 18 is a block diagram of the image recognizing apparatus of Embodiment 4 implemented by a computer.

FIG. 18 is a block diagram of an image recognizing apparatus implemented by a computer. The image recognizing apparatus comprises computer 1801, CPU 1802, memory 1803, keyboard and display 1804, storage medium unit 1805 such as an FD, a PD, an MO, a DVD or the like for storing an image recognizing program, interface (I/F) units 1806, 1807, and 1808, CPU bus 1809, camera 1810 for capturing an image, image database 1811 for supplying pre-stored image data, shape database 1812 storing model images of objects of various shapes together with their corresponding shape identifiers, and output terminal 1813 for delivering the shape and the position of the object identified via the I/F units.

Figure 19:
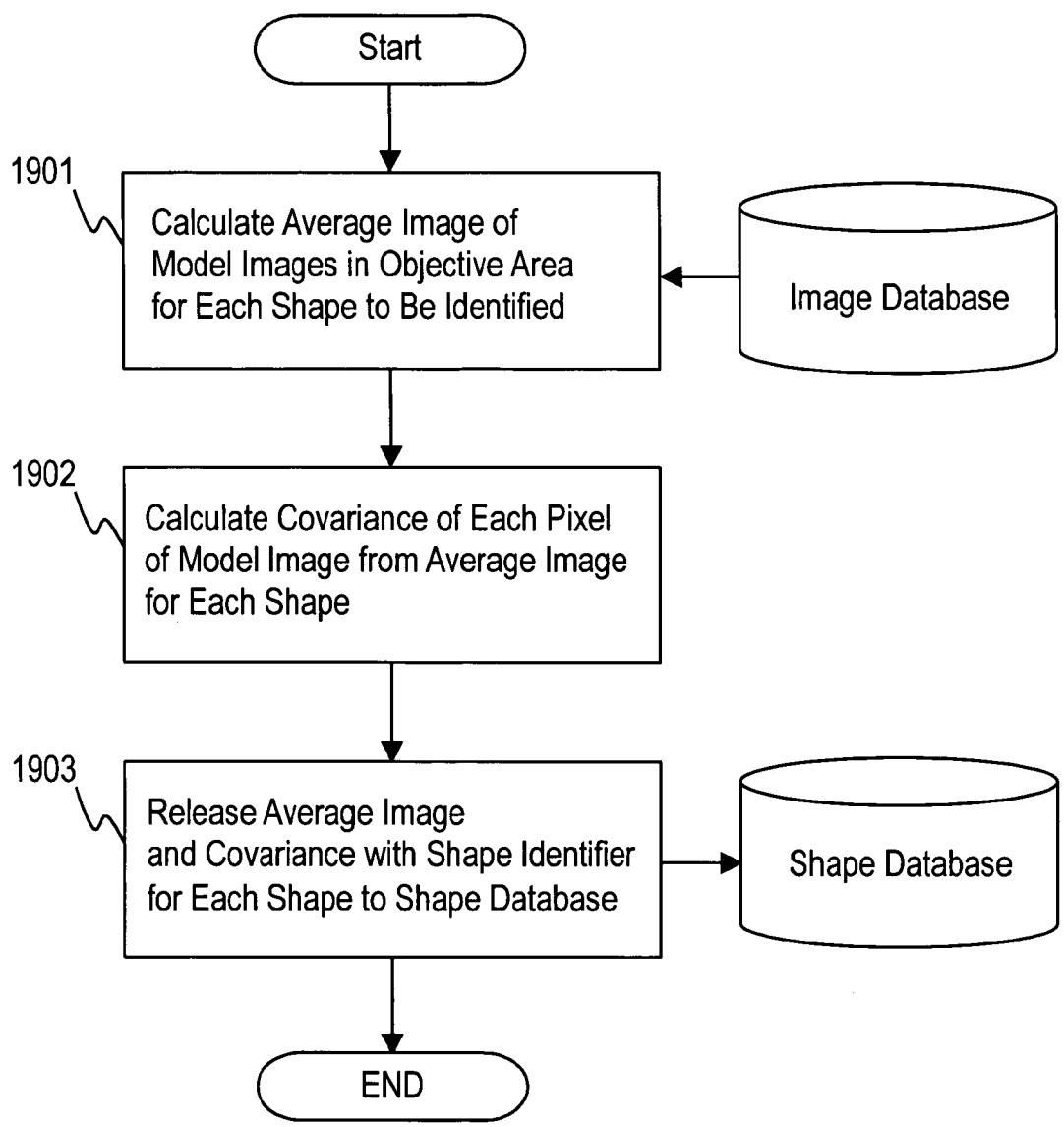
FIG. 19 is a flowchart showing a procedure of the operation of model generating means of Embodiment 4.
Figure 20:
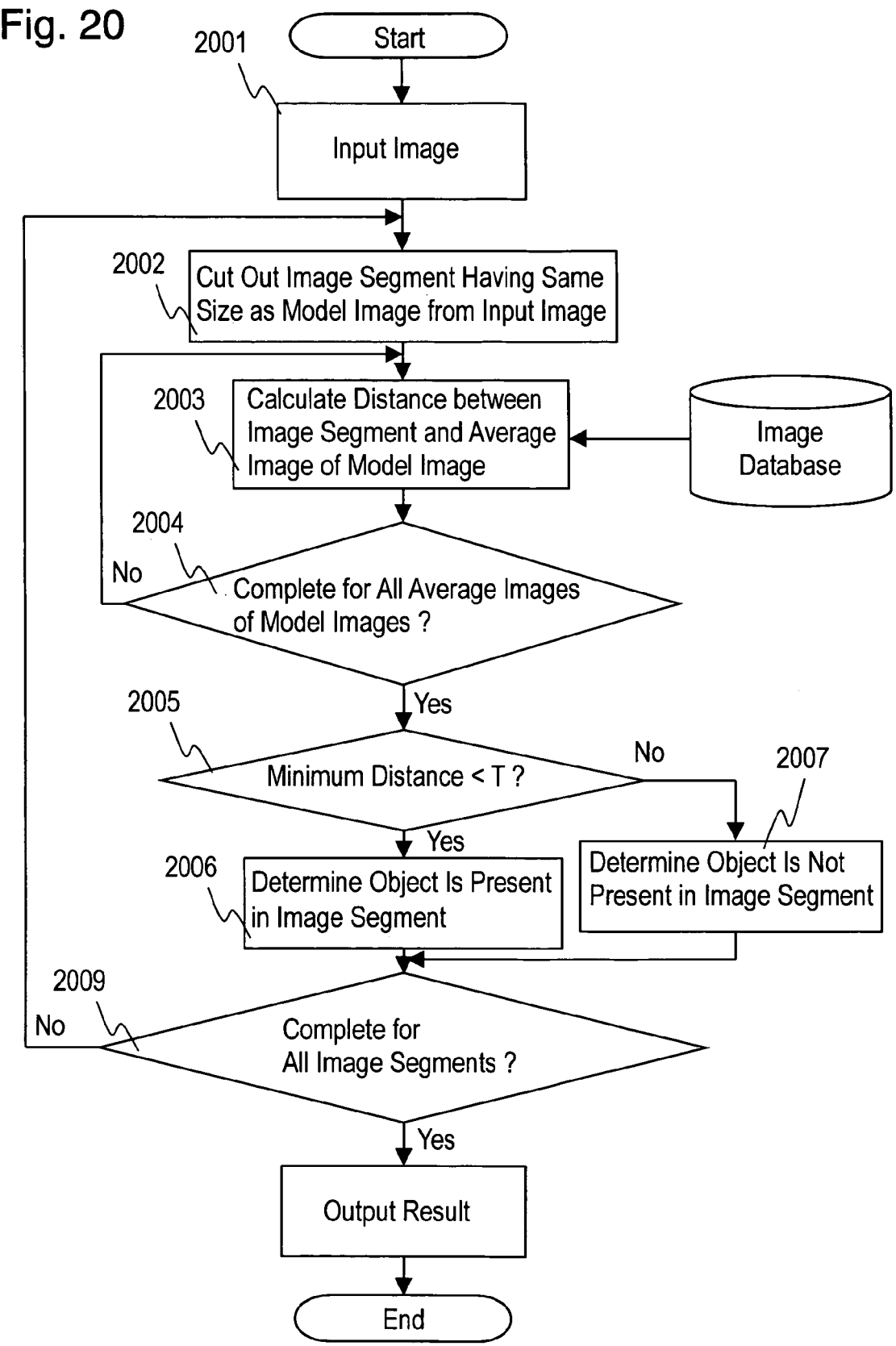
FIG. 20 is a flowchart showing a procedure at an image input unit through an output unit in Embodiment 4.
Figure 23:
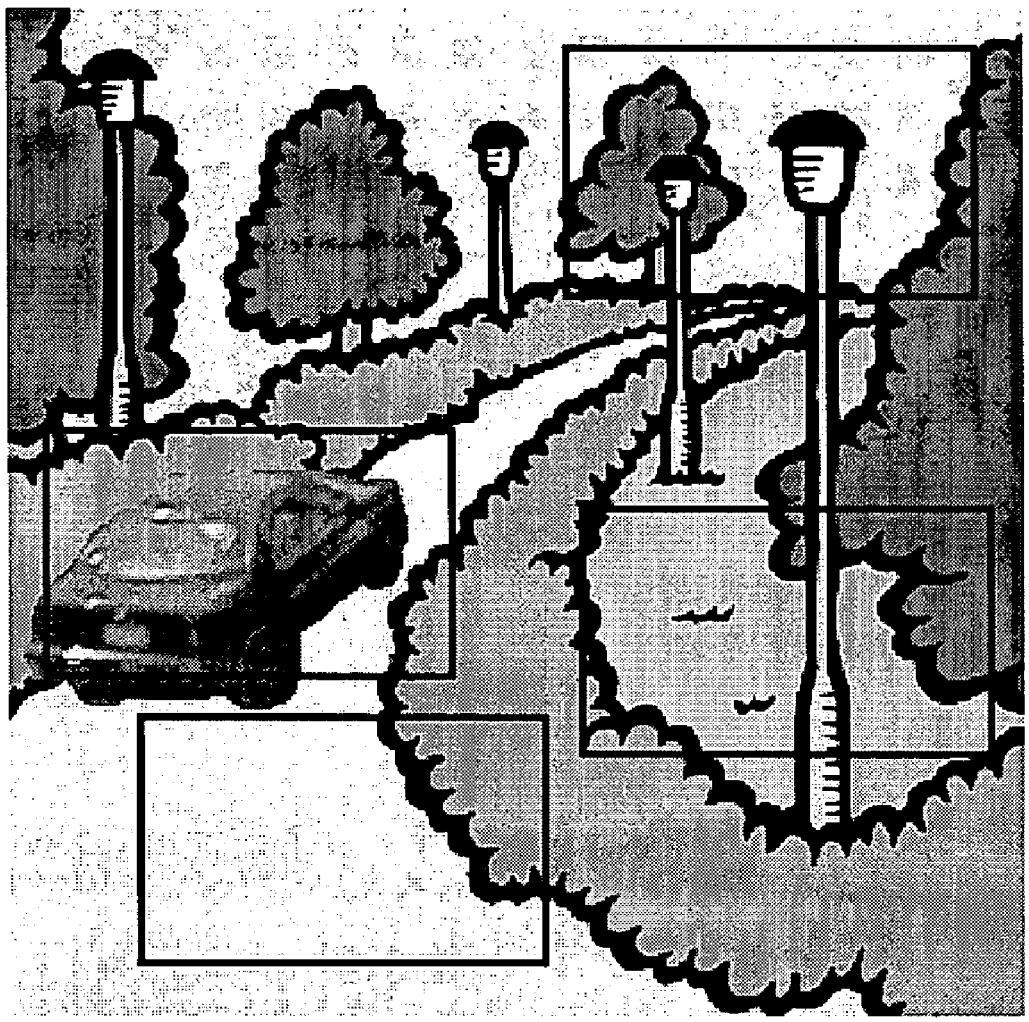
FIG. 23 illustrates examples of rectangular segments cut out by an image cutout unit.
Figure 24:
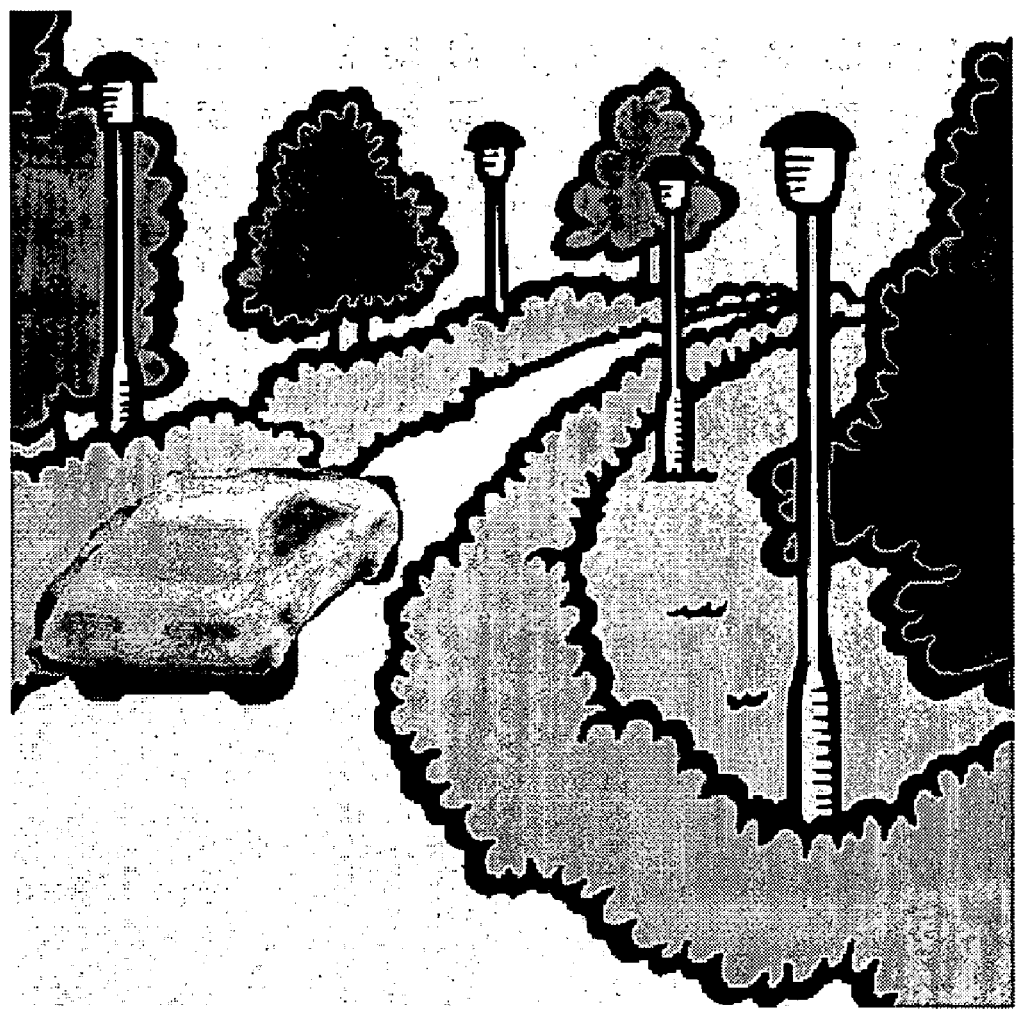
FIG. 24 illustrates an example of a detection result released by an output unit.

The operation of the image recognizing apparatus having the above arrangement is now explained referring to the flowcharts shown in FIGS. 19 and 20. FIG. 19 is the flowchart showing an operation of the model generating means. FIG. 20 is the flowchart showing a procedure from inputting an image data to be examined to outputting a result of recognition. FIG. 21 illustrates examples of the model image stored in image database 1701. FIG. 22 illustrates an example of the average data of one shape with its shape identifier stored in shape database 1703. FIG. 23 illustrates an input image received from image input unit 1704 and includes rectangular image segments cut out by image cutout unit 1705. FIG. 24 illustrates a resultant output of shape classifying means 1706 displayed on the display with output unit 1707.

Prior to recognition, data about the shapes to be identified are prepared. Image database 1701 stores gradation images of various objects such as shown in FIG. 21 in the form of files as a model image. Each image is accompanied with a shape identifier including the shape image, an image file name, and the coordinates at the upper left and the lower right corners of a rectangular which circumscribes the object as an object area. The model images shown in FIG. 21 illustrate different sedan-type vehicles captured from the common angle and distance by a camera.

When a "sedan A"-type vehicle such as shown in FIG. 21 is an object of a shape to be identified, model generating means 1702 retrieves all model images accompanied with a shape identifier including the shape name of "sedan A" from image database 1701 together with the shape identifier. Then, feature level extracting unit 1721 calculates an average image of rectangular sized images determined as objective areas (Step 1901). As the model images carry objects of the same shape, their cutout image segments as the objective areas are equal in the size and the average image is also identical in the size.

The average image of "sedan A" shown in FIG. 21 consists of 148 pixels in horizontal by 88 pixel in vertical. Then, feature level extracting unit 1721 calculates a variance from the pixel in the rectangular as the objective area and the corresponding pixel of the average image for each model image (Step 1902).

Finally, feature level extracting unit 1721 releases the average image of "sedan A", the variance for each pixel, and the corresponding shape identifier, then, shape database 1703 stores them (Step 1903). In case that a plurality of objects of shapes to be identified are provided, the procedure from Step 1901 to Step 1903 is repeated for examining the respective shapes.

For recognition of the "sedan A"-type vehicle, image input unit 1704 (camera 210 or image database 211) supplies an input image (Step 2001). Image cutout unit 1705 cuts out, from the input image, each image segment which is equal in the size to the average image of "sedan A" stored in shape database 1703 through moving the rectangular window having the same size as the average image as shown in FIG. 23 (Step 2002).

Shape classifying means 1706 receives one image segment from image cutout unit 1705 and the average image of "sedan A" and the variance from shape database 1703. Segment shape classifying unit 1761 calculates the square of a difference between each pixel of the image segment and the corresponding pixel of the average image, divides the square by the variance, and calculates a sum of the quotients to determine the distance between the image segment and the average image (Step 2003). In case that the objects of shapes to be identified are two or more, segment shape classifying unit 1761 repeats the operation of Step 2003 for each shape (Step 2004). When the least calculated distances is less than a certain value (Step 2005), it is judged that the image segment contains an object of the shape of the average image which is pertinent to the least distance (Step 2006).

Segment shape classifying unit 1761 judges that no object is present in the image segment when the least distance is not less than the certain value (Step 2007). The above operation is repeated by segment shape classifying unit 1761 for each segment image separated from the input image (Step 2008). When it is judged that the image segment contains the object, output unit 1707 places the shape of the object over the segment image in the input image as shown in FIG. 24 (Step 2009). A resultant image is then released via I/F unit 1808 from output terminal 1813.

Embodiment 5

Figure 25:
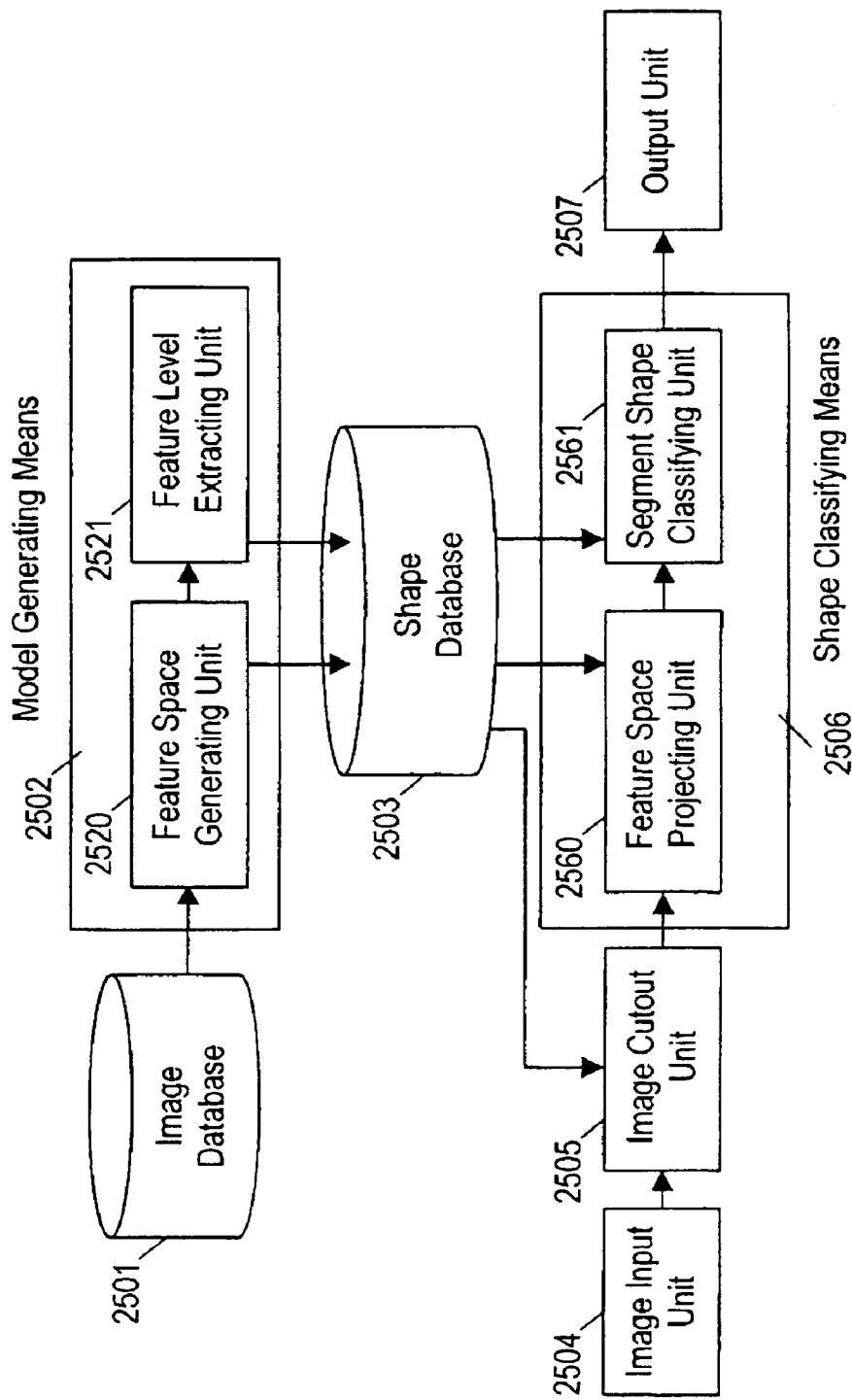
FIG. 25 is a block diagram of an image recognizing apparatus according to Embodiment 5 of the present invention.

FIG. 25 is a block diagram of an image recognizing apparatus according to Embodiment 5 of the present invention.

Image database 2501 stores gradation images of various objects of shapes to be identified. Database 2501 also stores a shape identifier specifying the name of each shape, the image file name, and the coordinates at the upper left and the lower right corners of a rectangular of a predetermined size which circumscribes the object of the shape to be identified. Model generating means 2502 retrieves all the gradation images of each shape of the object to be identified from image database 2501 and extracts the feature of the images. Feature space generating unit 2520 generates a feature space from the model images received from image database 2501 and transfers its base vector to shape database 2503 where each model image is projected to the feature space as a model image vector. Feature level extracting unit 2521 calculates an average and a variance of all the model image vectors of the shapes received from feature space generating unit 2502 for each shape and releases them together with the relevant shape identifier. Shape database 2503 receives and stores the base vector in the feature space from feature space generating unit 2520 and the average and variance of the model image vectors of each shape with the shape identifier from feature level extracting unit 2521. Image input unit 2504 supplies an image to be determined whether the object of a shape to be identified is present therein. Image cutout unit 2505 is responsive to the shape identifier from shape database 2503 for cutting out a segment image, which is equal in the size to the shape to be identified, from the input image. Shape classifying means 2506 examines whether or not an object of the shape to be identified is present in the image segment received from image cutout unit 2505. Feature space projecting unit 2560 projects, to the feature space, the image segment received from image cutout unit 2505 as an image segment vector based on the base vector received from shape database 2503. Segment shape classifying unit 2561 calculates a distance between the segment image vector received from feature space projecting unit 2560 and the average of model shape vectors retrieved from shape database 2503, and classifying unit 2561 determines whether or not the image segment coincides the shape to be identified. Output unit 2507, when receiving an output of the shape classifying means 2506 indicating that the object of the shape to be identified is present in the image segment, display the shape and the position of the object in the image segment on a display.

Figure 26:
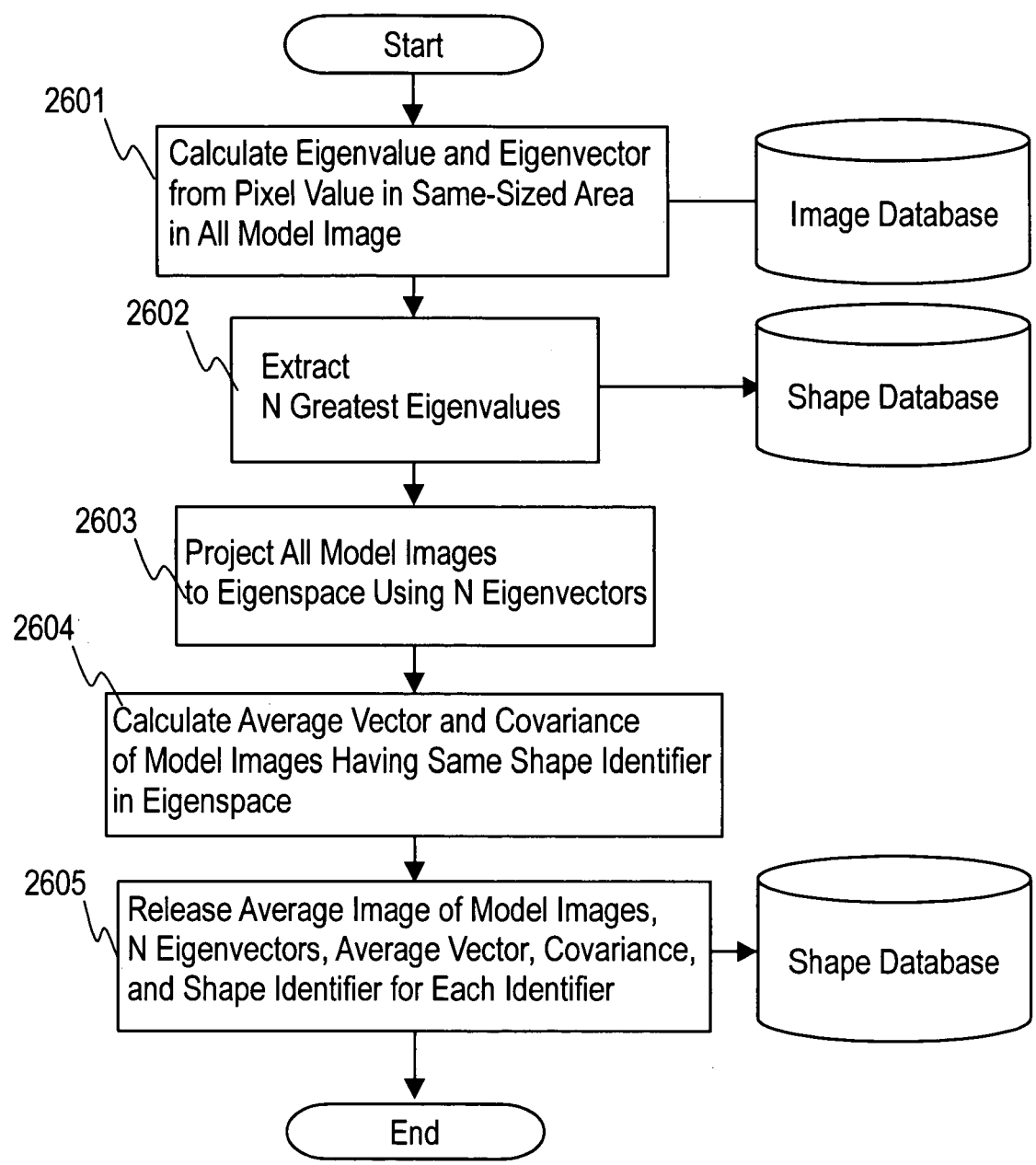
FIG. 26 is a flowchart showing a procedure of the operation at model generating means of Embodiment 5.
Figure 27:
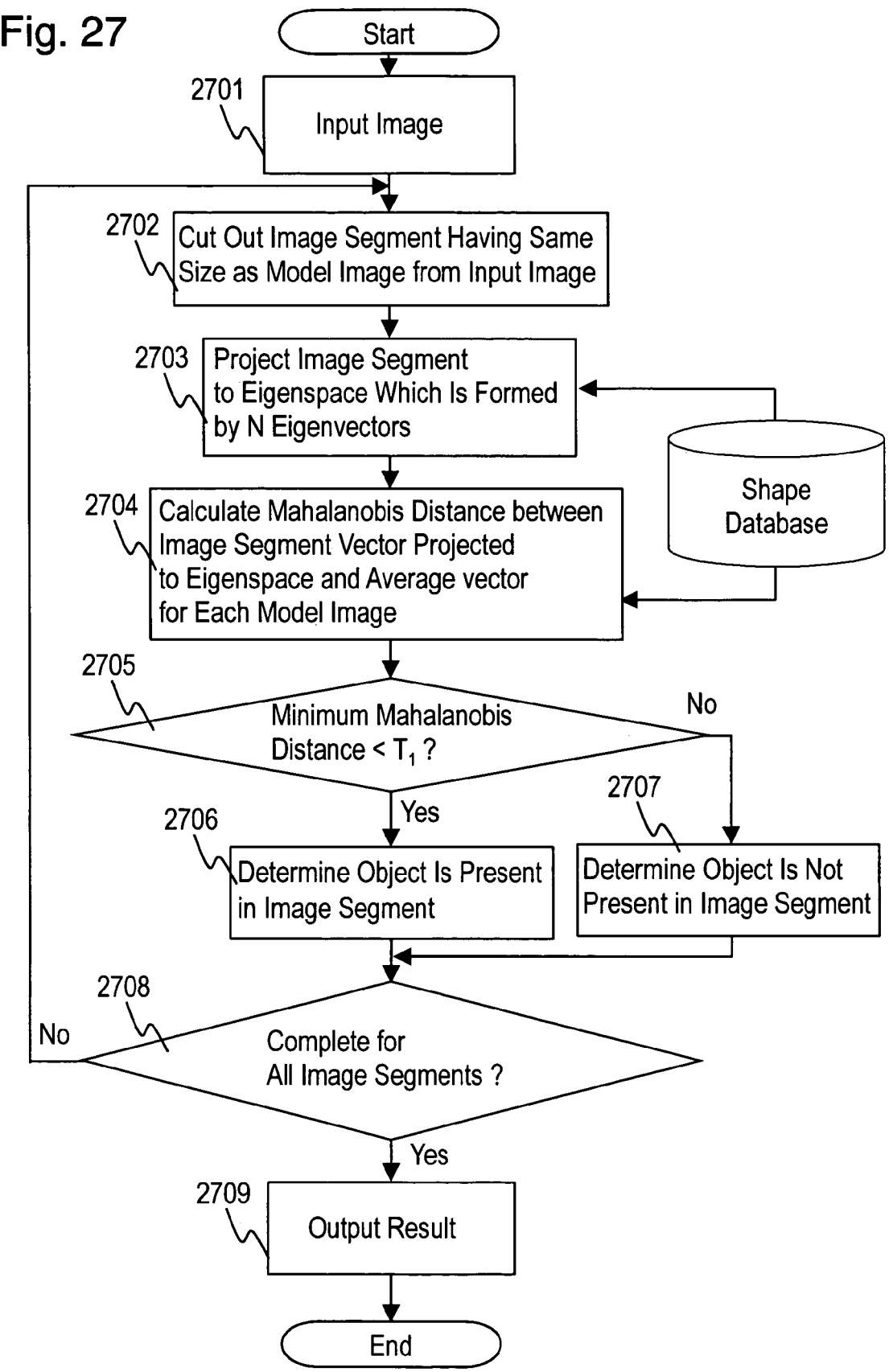
FIG. 27 is a flowchart showing a procedure of an operation at an image input unit through an output unit in Embodiment 5.

The operation of the image recognizing apparatus having the above arrangement is now explained referring to the flowcharts shown in FIGS. 26 and 27. FIG. 26 is the flowchart showing an operation of the model generating means. FIG. 27 is the flowchart showing a procedure from inputting an image to be examined through outputting a result of recognition. FIG. 28 illustrates examples of the model image stored in image database 2501. FIG. 23 illustrates an example of a rectangular segment image which is cut out by image cutout unit 2505 from an input image received from image input unit 2504. FIG. 24 illustrates a resultant output of shape classifying means 2506 displayed on the display.

Prior to recognition, databases about the shapes to be identified are prepared. Image database 2501 stores gradation images of various objects in the form of files such as model images as shown in FIG. 28. Each image is accompanied with the shape identifier specifying a shape of an object, an image file name, and the coordinates at the upper left and the lower right corners of a rectangular which circumscribes the object as an image area. The model images shown in FIG. 28 show a sedan-type vehicle and a bus captured from the common angle and distance by a camera.

When the "sedan A"-type vehicle and the bus shown in FIG. 28 are the objects of the shapes to be identified, model generating means 2502 retrieves all the model images of vehicles accompanied with the shape identifier specifying the shape name of "sedan A" and all the model images accompanied with the shape identifier specifying the shape name of "bus rear portion" from image database 2501 and transfers them to feature space generating unit 2520 together with the shape identifiers.

Feature space generating unit 2520 calculates an eigenvalue and an eigenvector from the pixel in the rectangular area in the model image (Step 2601). The rectangular areas in each model image are equal in the size, each consisting of 148 pixels in horizontal by 88 pixels in vertical as shown in FIG. 28. For the bus, the rectangular shape shown in FIG. 28 is an objective area at the same position for all the model images of buses. A vector formed as a row of all the pixels in each model image is generated, and an average vector of the vectors is calculated and subtracted from each vector for determining the eigenvalue and an eigenspace.

Feature space generating unit 2520 stores the eigenvectors corresponding to the N greatest eigenvalues as base vector in shape database 2503 (Step 2602). Using the N eigenvalues, generating unit 2520 projects each model image as a model image vector in the feature space (Step 2603).

Feature level extracting unit 2521 receives the model image vector with its shape identifier from feature space generating unit 2520 and calculates an average and a covariance of the model image vectors having the same shape identifier (Step 2604). Feature level extracting unit 2521 releases the average of the model Images and the average and the covariance of model image vectors of each shape together with their corresponding shape identifiers, and shape database 2503 stores them (Step 2605).

For the recognition, an image to be identified is supplied from image input unit 2504 (Step 2701). Image cutout unit 2505 determines the size of a mode image from the objective area specified by the shape identifier stored in shape database 2503. Then, image cutout unit 2505 cuts out image segments having the same size through moving a window from the input image as shown in FIG. 23 (Step 2702).

Shape classifying means 2506 receives one image segment from image cutout unit 2505 and the base vector from shape database 2503. Feature space projecting unit 1760 projects the image segment as a image segment vector in the eigenspace (Step 2703). Segment shape classifying unit 2561 receives the image segment vector from feature space projecting unit 2560 and the average vectors and covariances of the "sedan A"-type vehicle and the bus from shape database 2503 respectively, and calculates a Mahalanobis distance between the image segment vector and the average vector (Step 2704).

When the least Mahalanobis distances is less than a certain value (Step 2705), it is judged that the image segment contains an object of the shape pertinent to the average vector of the least distance (Step 2706). If the least distance is not less than the certain value, it is judged that the image segment contains no object to be identified (Step 2707). Feature space projecting unit 2560 and segment shape classifying unit 2561 repeats the process from Step 2703 to Step 2707 for each of the image segments which are cut out from the input image (Step 2708). When it is judged that the image segment contains the object, output unit 2507 places the shape of the object over the image segment in the input image as shown in FIG. 24 (Step 2709). A resultant image is then released via I/F unit 1808 from output terminal 1813.

Embodiment 6

Figure 29:
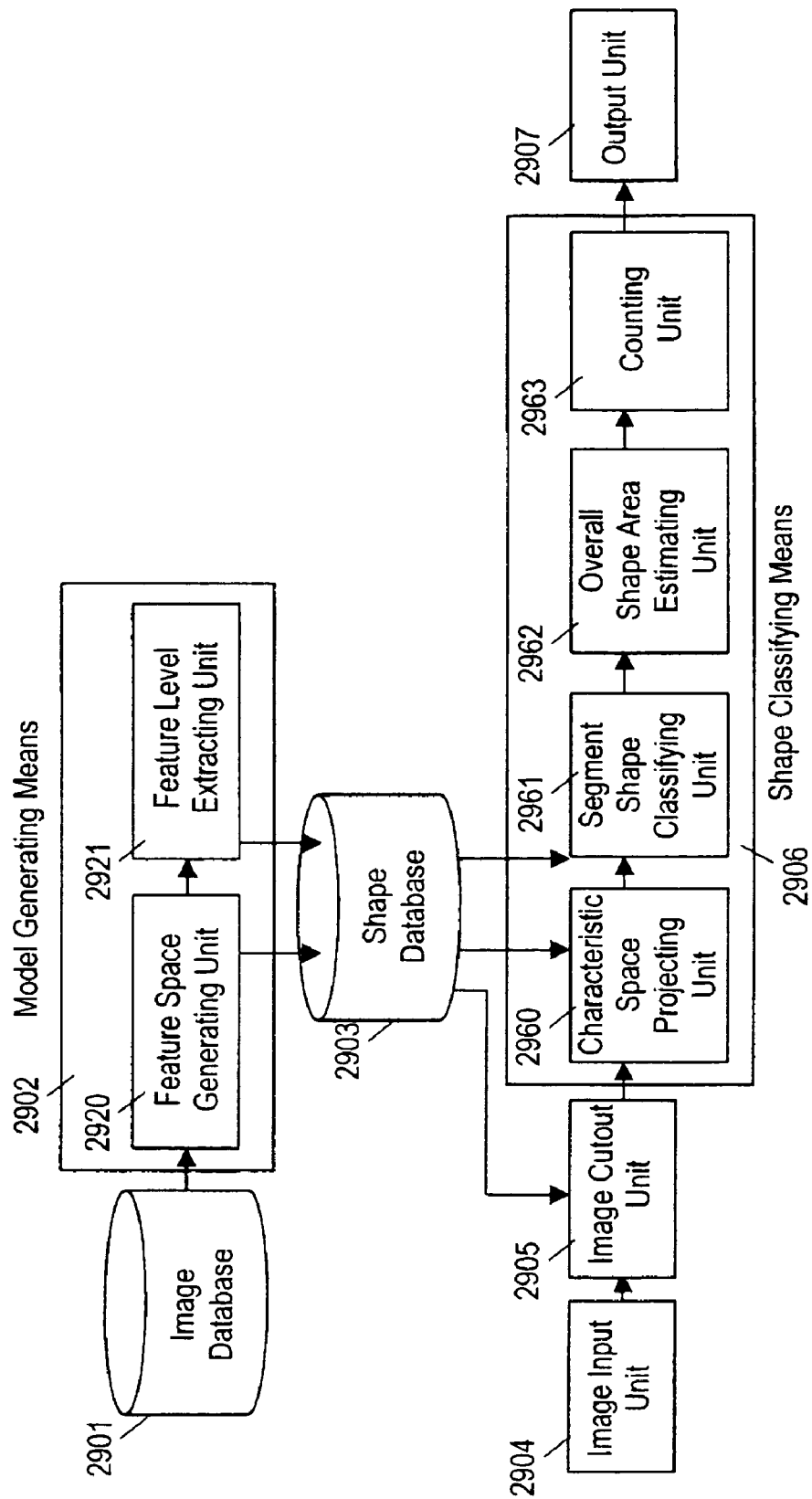
FIG. 29 is a block diagram of an image recognizing apparatus according to Embodiment 6 of the present invention.

FIG. 29 is a block diagram of an image recognizing apparatus according to Embodiment 6 of the present invention.

Image database 2901 divides each of gradation images of various objects of the shape to be identified into rectangular shape segments having a predetermined size and stores each of the shape segments with the shape identifier specifying a shape name, a file name, and coordinates at the upper left and the lower right corners of the shape segment. Model generating means 2902 retrieves all the gradation images of the object of the shape to be identified from image database 2901 and extracts its feature. Feature space generating unit 2920 generates a feature space from the pixel values of all the shape segments in each model image received from image database 2901 and transfers its base vector to shape database 2903 where each shape segment is projected as a model image local vector to the feature space. Feature level extracting unit 2921 calculates an average and variance of all the model image local vectors received from feature space generating unit 2902 for each shape segment and releases them together with the relevant shape identifier. Shape database 2903 receives the base vector of the feature space from feature space generating unit 2920 and the average and variance of the model image local vectors together with the shape identifier for each shape segment from feature level extracting unit 2921, and stores them. Image input unit 2904 supplies an input image to be determined whether an object of a shape to be identified is present therein. Image cutout unit 2905 is responsive to a shape identifier from shape database 2903 and cuts out an image segment having the same size as the shape segment from the input image. Shape classifying means 2906 examines whether or not an object of a shape to be identified is present in the image segment received from image cutout unit 2905. Feature space projecting unit 2960 projects the image segment received from image cutout unit 2905 to the feature space as an image segment vector based on the base vector received from shape database 2903. Segment shape classifying unit 2961 calculates a distance between the image segment vector received from feature space projecting unit 2960 and each average of model image local vectors retrieved from shape database 2903 and determines whether or not the image segment vector matches the shape segment of the shape of the object to be identified. As shape segment classifying means 2961 detects the shape segment of the shape of the object to be identified, overall shape area estimating unit 2962 estimates the area in which the overall shape of the object exists in the input image from the position of the shape segment in relation to the overall shape. Counting unit 2963 counts the position of the overall shape of the object received from the overall shape area estimating unit 2962 for each image segment containing the shape segment of the shape of the object. Upon judging that the object is located at the position which is determined a number of times greater than a certain number by counting unit 2963, output unit 2907 displays the shape and the position of the object on a display.

Figure 30:
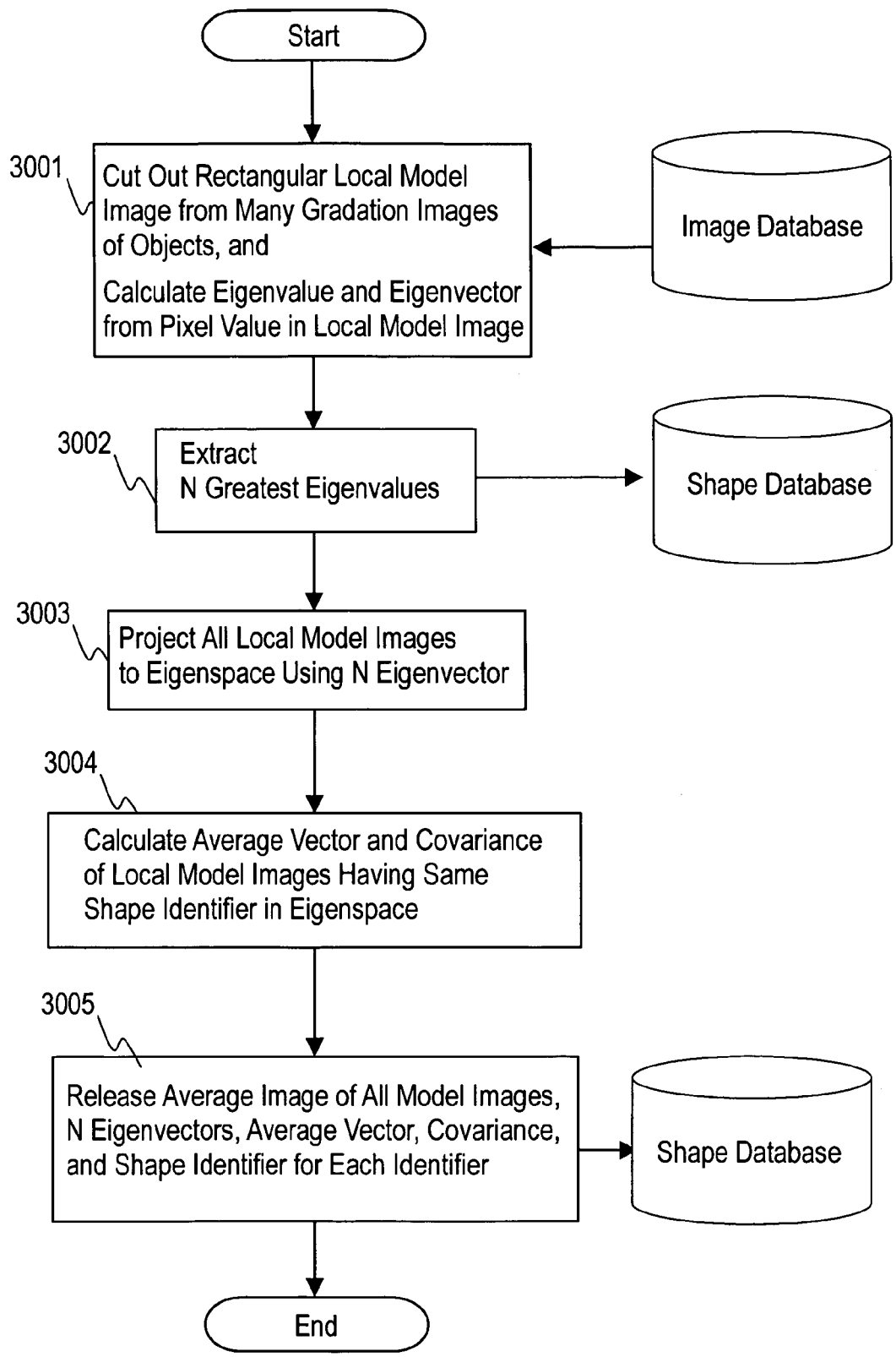
FIG. 30 is a flowchart showing a procedure of an operation at model generating means of Embodiment 6.
Figure 31:
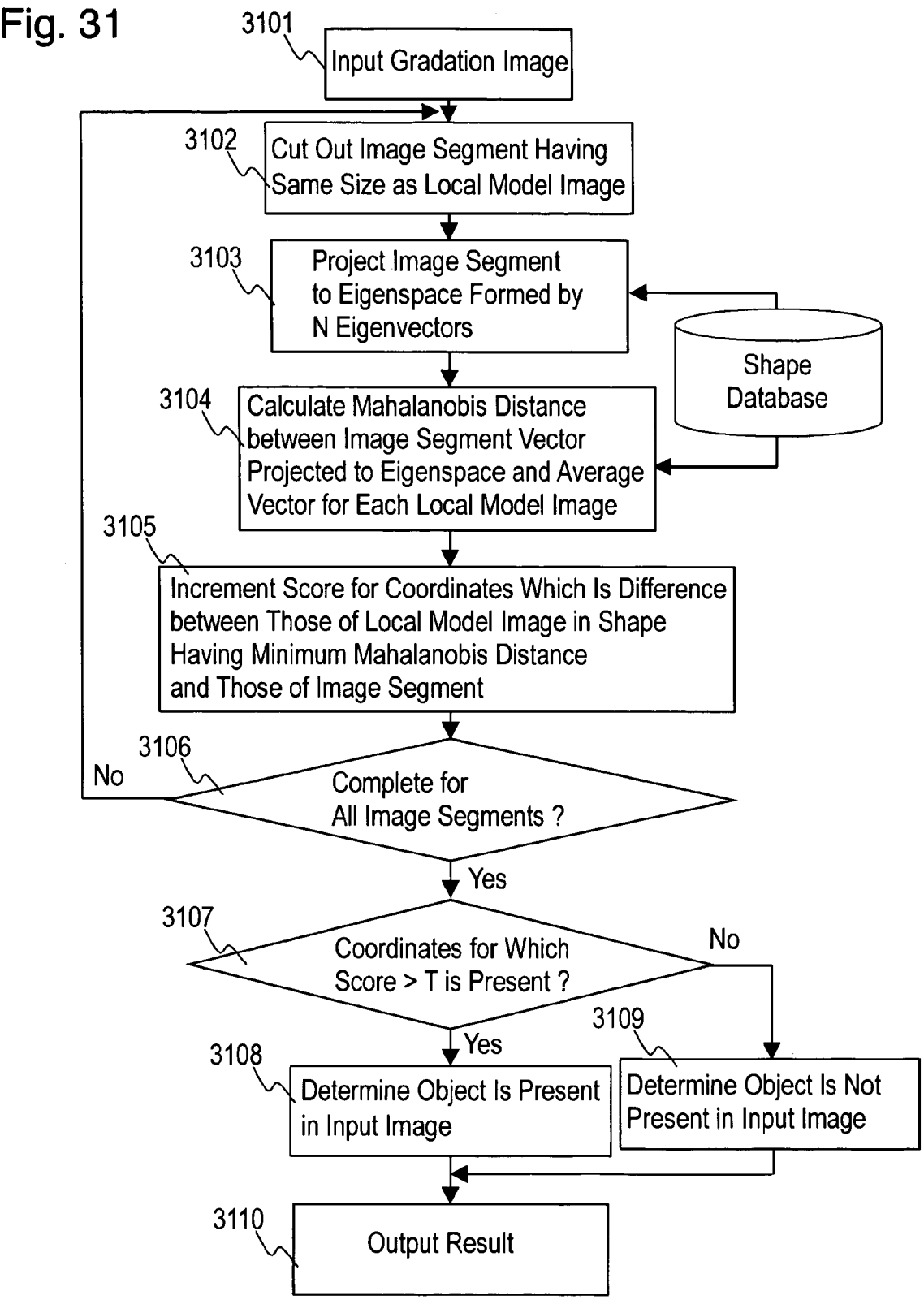
FIG. 31 is a flowchart showing a procedure of an operation at an image input unit through an output unit in Embodiment 6.
Figure 32:
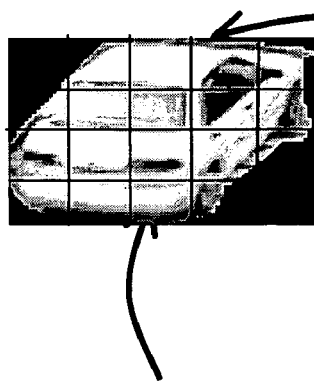
FIG. 32 illustrates an example of model images and its shape identifier stored in an image database of Embodiment 6.
Figure 33:
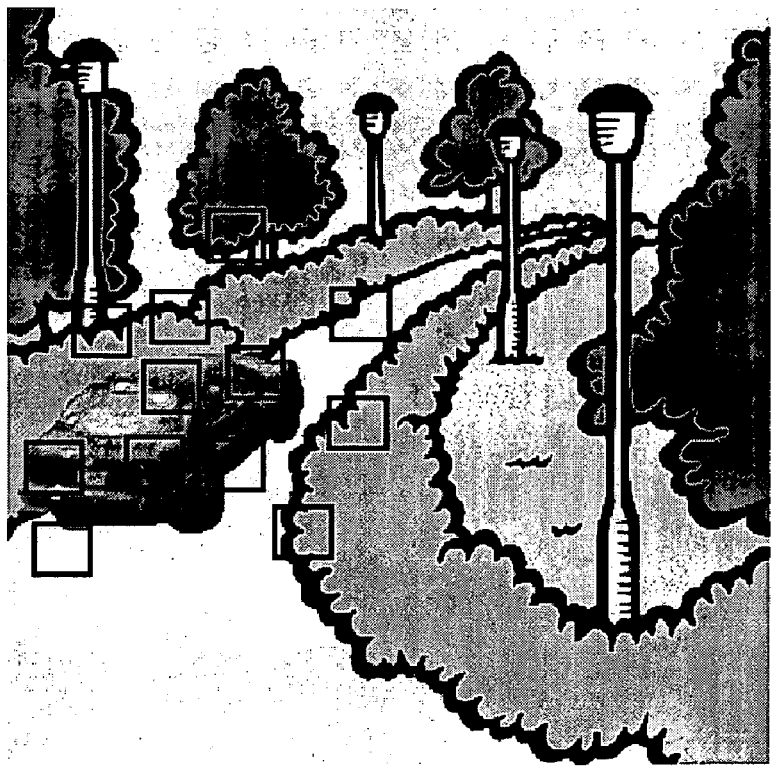
FIG. 33 illustrates examples of rectangular segments cut out by an image cutout unit of Embodiment 6.
Figure 34:
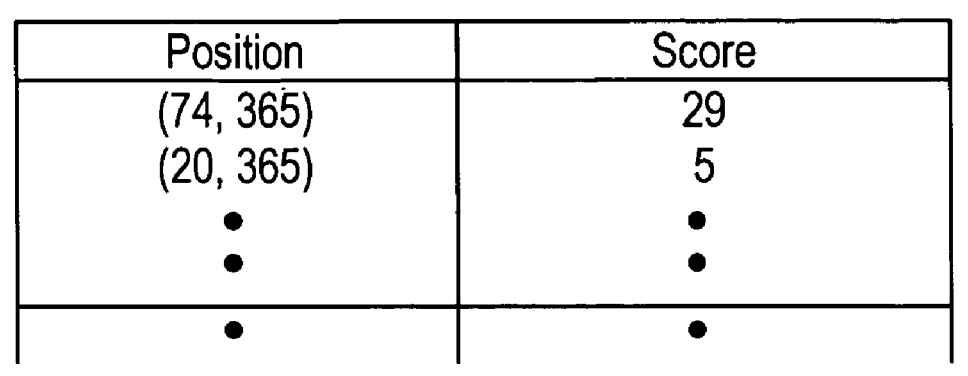
Figure 35:
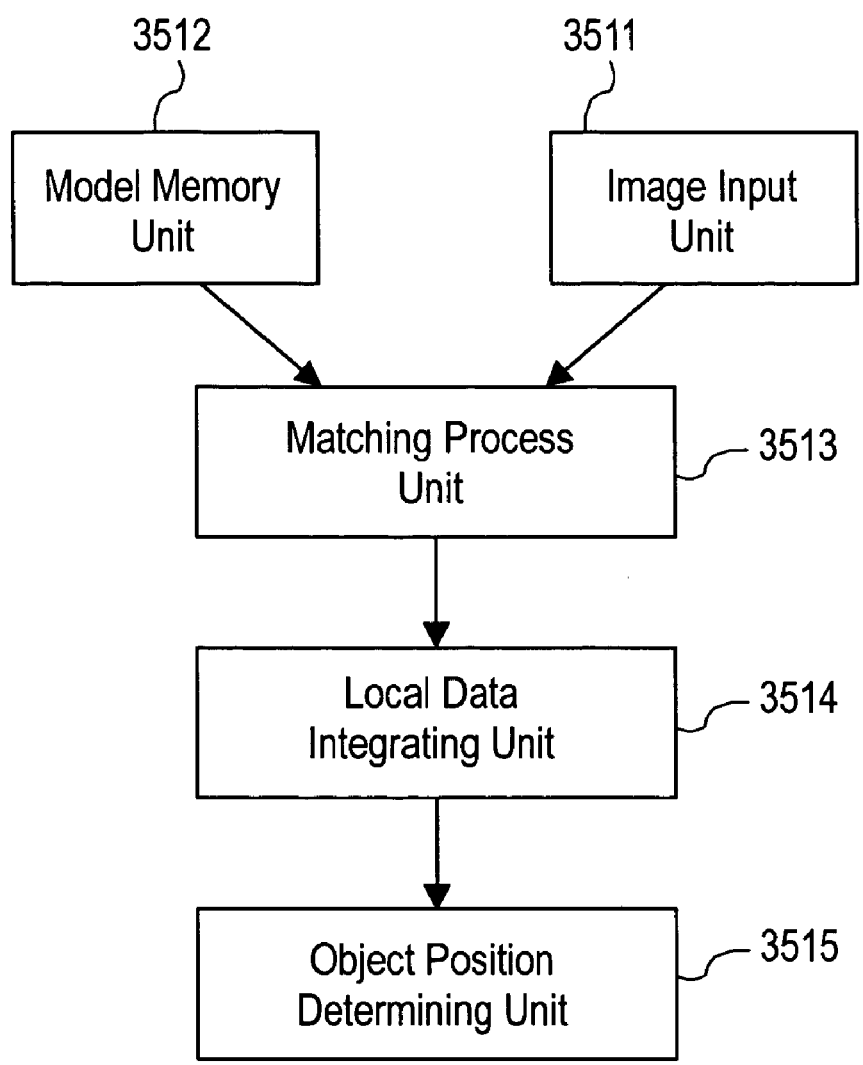
FIG. 35 is a block diagram showing a conventional image recognizing apparatus.
Figure 36:
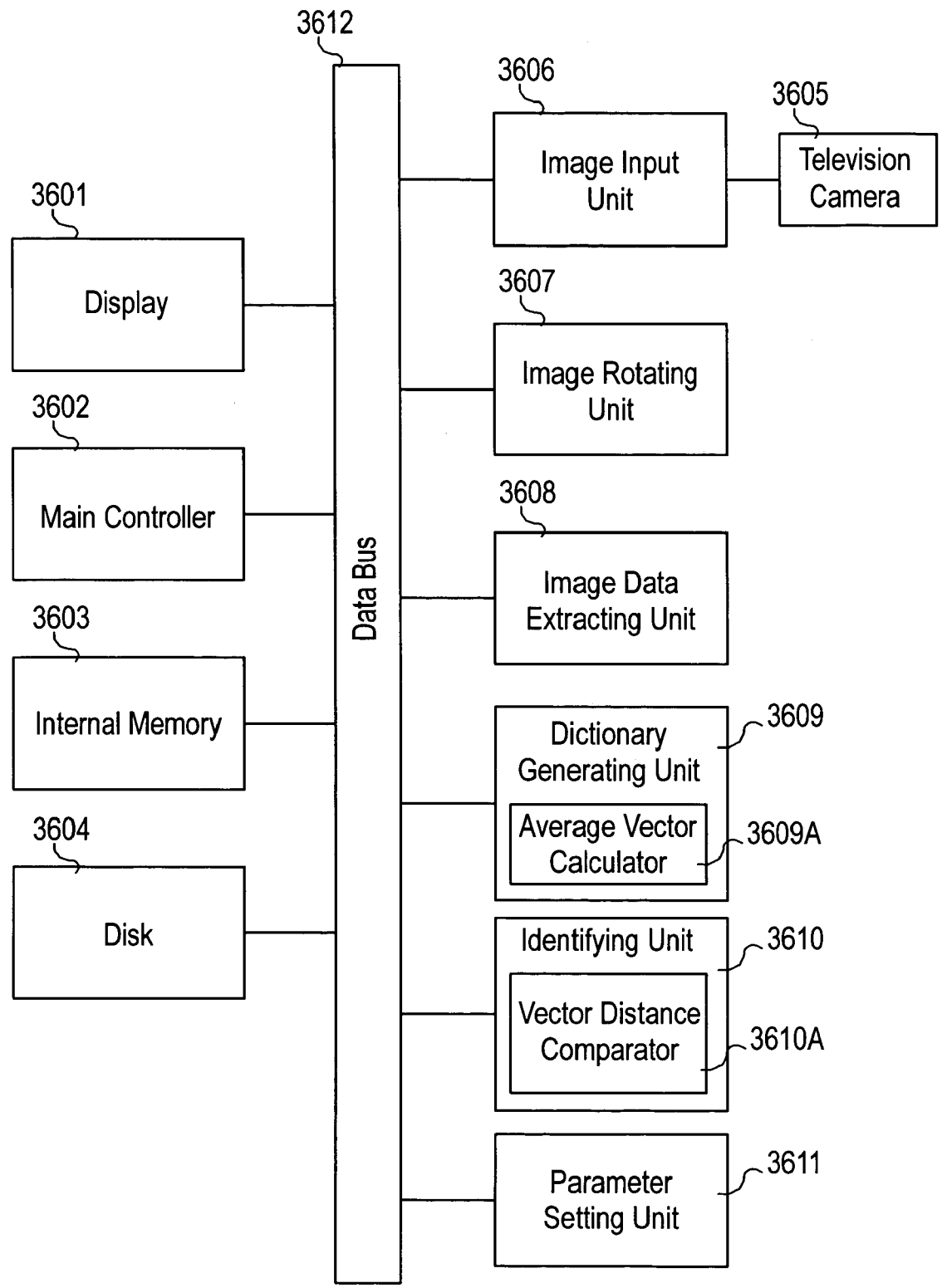
FIG. 36 is a block diagram showing another conventional image recognizing apparatus.

The operation of the image recognizing apparatus having the above arrangement is now explained referring to the flowcharts shown in FIGS. 30 and 31. FIG. 30 is the flowchart showing an operation of the model generating means. FIG. 31 is the flowchart showing a procedure from inputting an image to be examined through outputting a result of recognition. FIG. 32 illustrates examples of the model image stored in image database 2901. FIG. 33 illustrates an input image which is received from image input unit 2904 and includes rectangular image segments cut out by image cutout unit 2905. FIG. 34 illustrates a resultant output of counting unit 2963. The resultant output of shape classifying means 2906 to be displayed on the display is shown in FIG. 24.

Prior to the recognition, data about the shapes to be identified are prepared. Image database 2901 stores gradation images of the object in the form of files such as shown in FIG. 32. Each gradation image is divided into local-segments having a predetermined size of a rectangular and each local-segment is accompanied with the shape identifier specifying a local-segment name, a file name, and the coordinates at the upper left and the lower right corners of the local-segment. The local-segment name comprises the name of an overall shape of "sedan A" of the object, and a number identifying the local-segment in the overall shape. The number denotes the same position regardless of the overall shape of the object to be identified. The local-segments may overlap each other. FIG. 32 shows an example of a model image for identifying a sedan-type vehicle captured by a camera from the shown angle and distance. Actually, local-segments of plural images of similar looking sedan-type vehicles are stored together with shape identifiers of the local-segments.

When the "sedan A"-type vehicle such as shown in FIG. 32 is an object to be identified, model generating means 2902 retrieves all the model images of vehicles accompanied with the shape identifier of "sedan A" from image database 2901 and transfers them with the shape identifiers to feature space generating unit 2920. Generating unit 2920 calculates an eigenvalue and an eigenvector from the pixel value in each rectangular local-segment in the model image accompanied with the shape identifier as a local model image (Step 3001). The local model images in each model image are equal in the size, each consisting of 29 pixels in horizontal by 22 pixels in vertical as shown in FIG. 32. To calculate the eigenvector, a vector which is a row of the pixels in each local model image is generated, and an average of the vectors is calculated and subtracted from each vector for determining the eigenvalue and an eigenspace.

Feature space generating unit 2920 generates the eigenvector corresponding to N greatest eigenvalues as the base vector, and shape database 2903 stores it (Step 3002). Using the N eigenvalues, feature space generating unit 2920 projects each local model image in the feature space to generate a local model image vector (Step 3003). Feature level extracting unit 2921 receives the local model image vector with its shape identifier from feature space generating unit 2920 and calculates an average and covariance of the local model image vectors accompanied with the same shape identifier (Step 3004). Feature level extracting unit 2921 releases the average of all the local model images and the average and covariance of local model vectors for each shape, and shape database 2903 stores them together with their corresponding shape identifiers (Step 3005). For recognition, an image to be determined whether an object to be identified is present therein is supplied from image input unit 2904 (Step 3101). Image cutout unit 2905 calculates the size of a local-segment from the objective area determined by the shape identifier stored in shape database 2903. Then, image cutout unit 2905 cuts out each segment having the same size from the input image through moving a window as shown in FIG. 33 (Step 2702).

Shape classifying means 2906 receives one image segment from image cutout unit 2905 and the base vector from shape database 2903. Feature space projecting unit 2960 projects the image segment in the feature space as a partial image vector (Step 3103). Segment shape classifying unit 2961 receives the image segment vector from feature space projecting unit 2960 and the average vectors and covariances of local-segments of "sedan A" from shape database 2903 to calculate a Mahalanobis distance between the image segment vector and each average vectors (Step 3104). Then, classifying unit 2961 releases the shape identifier belonging to the local-segment having the average vector pertinent to the least distance. Overall shape estimating unit 2962 calculates a difference between the coordinates at the upper left corner of the objective area defined by the shape identifier and the coordinates at the upper left corner of the image segment in the input image, and counting unit 2961 increments the score for the coordinates by one (Step 3105). The coordinates for which score is incremented represent the position of the object in the input image.

Shape classifying means 2906 including feature space projecting unit 2960 through counting unit 2963 repeats the process from Step 3103 to Step 3105 for all the image segments which are cut out from the input image (Step 3106). The result in counting unit 2963 is shown in FIG. 34. In FIG. 34, a series of the coordinates are listed with the score for them in the order from the highest score. When the score for the coordinates is greater than a certain number (Step 3107), it is judged that the object is present at the coordinates in the input image (Step 3108). Then, output unit 2907 places the shape of the object over the image segment in the input image as shown in FIG. 24 (Step 3110). If none of the scores is greater than the certain number at Step 3107, it is then judged that the input image carries no object to be identified (Step 3109), and the input image is directly released (Step 3110). A resultant image is then released via I/F unit 1808 from output terminal 1813.

As set forth above, the object recognizing apparatuses of the present invention can readily detect a feature of a shape of objects from a less amount of model data even if the surface color of the object is different. Also, even if an object to be identified is partially visible in an input image, the apparatuses of the present invention can detect its shape and position can be detected at higher accuracy.

What is claimed is:

1. An image recognizing method of recognizing an object in an input image, said method comprising the steps of:
    (a) providing a learning image database storing a plurality of learning-local-segments provided by dividing a learning image into the plurality of learning-local-segments, the learning image including an image model of the object, the learning image database further storing coordinates of each of the learning-local segments;
    (b) dividing the input image into a plurality of local-segments;
    (c) selecting a local-segment from the plurality of local-segments;
    (d) extracting, from the learning image stored in the learning image database, a learning-local-segment which is most similar to the selected local-segment so as to relate the selected local-segment to the extracted learning-local segment;

(e) estimating a position of the object in the input image from coordinates of the related local-segment and coordinates of the related learning-local-segment;

(f) providing the estimated position with a score if the estimated position is not previously estimated, and adding a predetermined value to the score of the estimated position in the input image if the estimated position is previously estimated;

(g) repeating steps (c), (d), (e), and (f) for each local-segment of the plurality of local-segments; and (h) judging that the object is present at the estimated position when the score to which the predetermined value is added is greater than a predetermined number for the estimated position.

2. The image recognizing method according to claim 1, wherein:

the learning image database stores the learning-local-segments by a shape-characteristic of the object;

said step (d) comprises the step of extracting the learning-local-segment which is similar to the selected local-segment from the learning image database by the shape-characteristic; and said step (f) comprises the step of updating the score of the estimated position by the shape-characteristic.

3. The image recognizing method according to claim 1, wherein:

said step (d) includes the steps of;

(d-1) calculating a sum of one of (i) each square of a difference between a pixel value of the selected local-segment and a pixel value of one of the learning-local-segments and (ii) each absolute value of the difference between the pixel value of the selected local-segment and the pixel value of the one of the learning-local-segments for each learning-local-segment;

(d-2) extracting a pair formed of the selected local-segment and a learning-local-segment for which the sum is minimized; and (d-3) relating the selected local-segment to the learning-local-segment in the pair extracted in said step (d-2).

4. An image recognizing method of recognizing an object in an input image, said method comprising the steps of:

(a) dividing the input image into a plurality of local-segments;

(b) providing a set of learning-local-segments into which learning image including an image model of the object is divided, the set of learning-local-segments having same sizes as the local-segments, and providing subsets, each formed of the learning-local-segments which are similar to each other;

(c) providing a same-type window database storing, for each of the subsets of learning-local-segments, image data of a representative learning-local-segment and coordinates of all of the learning-local-segments of each of the subsets in the learning image;

(d) selecting a local-segment from the plurality of local-segments;

(e) extracting a representative learning-local-segment from the same-type window database which is most similar to the selected local-segments;

as to relate the selected local-segment to a subset of the subsets which includes the representative learning-local-segment;

(f) estimating a position of the object in the input image from coordinates of the selected local-segment and coordinates of the related representative learning-local-segment;

(g) providing the estimated position with a score if the estimated position is not previously estimated, adding a predetermined value to the score for the estimated position in the input image if the estimated position is previously estimated;

(h) repeating steps (d), (e), (f), and (g) for each local-segment of the plurality of local-segments; and (i) judging that the object is present at the estimated position when the score to which the predetermined value is added is greater than a predetermined number for the estimated position.

5. The image recognizing method according to claim 4, wherein the same-type window database stores, for each subset of learning-local-segments, image data of the representative learning-local-segment and coordinates of all of the learning-local-segments of the corresponding subset and a shape-characteristic of the object.

6. The image recognizing method according to claim 4, wherein:

said step (e) includes the steps of;

(e-1) calculating a sum of one of (i) each square of a difference between a pixel value of the selected local-segment and a pixel value of one of the representative learning-local-segments and (ii) each absolute value of the difference between the pixel value of the selected local-segment and the pixel value of the one of the representative learning-local-segments for each learning-local-segment;

(e-2) extracting a pair formed of the selected local-segment and a representative learning-local-segment for which the sum is minimized; and (e-3) relating the selected local-segment to the representative learning-local-segment in the pair extracted in said step (e-2).

7. An image recognizing apparatus of recognizing an object in an input image, said apparatus comprising:

a learning image database for storing a plurality of learning-local-segments provided by dividing a learning image into the learning-local-segments, the learning image including an image model of the object, the learning image database further storing coordinates of each of the learning-local segments;

image dividing means dividing the input image into a plurality of local-segments:

similar window extracting means for selecting a local-segment from the plurality of local-segments, for extracting a learning-local-segment from the learning image database which is most similar to the selected local-segment, and for relating the selected local-segment to the extracted learning-local-segment;

object position estimating means for estimating a position of the object in the input image from coordinates of the related local-segment and coordinates of the related learning-local-segment;

counting means for providing the estimated position with a score if the estimated position is not previously estimated, for adding a predetermined value to the score of the estimated position in the input image if the estimated position is previously estimated, and for counting the score; and object determining means for judging that the object present at the estimated position when the counted score is greater than a predetermined number for the estimated position.

8. An image recognizing apparatus for recognizing an object in an input image, said apparatus comprising:

image dividing means for dividing the input image into a plurality of local-segments;

learning means for dividing a learning image into a set of learning-local-segments having same sizes as the local-segments and for making subsets, each subset formed of learning-local-segments, from the set of learning-local-segments, which are similar to each other and for each subset of learning-local-segments, the leaning image including an image of the object;

a same-type window database storing image data of a representative learning-local-segment and coordinates of all of subsets of the learning-local segments;

similar window extracting means for selecting a local-segment from the plurality of local-segments, for extracting from the same-type window database a representative learning-local-segment of one subset of the subsets which is most similar to the selected local-segment of the input image, and for relating the extracted representative learning-local-segment to the selected local-segment;

object position estimating means for estimating a position of the object in the input image from coordinates of the selected local-segment and coordinates of the related representative learning-local-segment;

counting means for providing the estimated position with a score if the estimated position is not previously estimated, for adding a predetermined value to the score of the estimated position if the estimated position is previously estimated, and for counting the score; and object determining means for judging that the object is present at the estimated position when the counted score is greater than a predetermined number for the estimated position.

9. The image recognizing apparatus according to claim 8, wherein said learning means includes:

similar window integrating means for making the subsets of learning-local-segments which are similar to each other and for releasing image data of the representative learning-local-segment of each subset and the coordinates of all of the learning-local-segments in each subset; and a same-type window database for storing the image data of the representative learning-local-segment of each subset and the coordinates of all of the learning-local-segments in each subset.

10. An image recognizing apparatus comprising:

image dividing means for dividing an input image into a plurality of local-segments;

learning means a learning image database for storing a plurality of learning-local-segments by a shape-characteristic of an objects, the learning-local-segments being provide by dividing a learning image into the learning-local-segments, the learning image including an image model of the object, the learning image database further storing coordinates of the learning-local-segments;

similar window extracting means for selecting a local-segment from the plurality of local-segments, for extracting a learning-local-segment from the learning image database by the shape-characteristic which is most similar to the selected local-segment, and for relating the extracted learning-local-segment to the selected local-segment by the shape-characteristic;

object position estimating means for estimating a position of the object in the input image from coordinates of the selected local-segment and coordinates of the related learning-local-segment by the shape-characteristic;

counting means for providing the estimated position with a score by the shape-characteristics if the estimated position is not previously estimated, for adding a predetermined value to the score of the estimated position by the shape-characteristic if the estimated position is previously estimated, and for counting the score; and object determining means for judging that the object present at the estimated position when the counted score is greater than a predetermined number.

11. A computer-readable storage medium holding a program for making a computer carry out an image recognizing method of recognizing an object in an input image, said image recognizing method comprising the steps of:

(a) providing a learning image database for storing a plurality of learning-local-segments provided by dividing a learning image into the plurality of learning-local-segments, the learning image including an image of the object, the learning image database further storing coordinates of each of the learning-local segments in the learning image;

(b) dividing the input image into a plurality of local-segments;

(c) selecting a local-segment from the plurality of local-segments;

(d) extracting, from the learning image stored in the learning image database, a learning-local-segment which is most similar to the selected local-segment of the input image;

as to relate the selected local-segment to the extracted learning-local-segment;

(e) estimating a position of the object in the input image from coordinates of the selected local-segment and coordinates of the related learning-local-segment;

(f) providing the estimated position with a score if the estimated position is not previously estimated, for adding a predetermined value to the score of the estimated position in the input image if the estimated position is previously estimated, and counting the score;

(g) repeating steps (c), (d), (e), and (f) and (g) for each local-segment of the plurality of local-segments; and (h) judging that the object to be identified is present at the estimated position when the counted score is greater than a predetermined number for the estimated position.

* * * * *

UNITED STATES PATENT AND TRADEMARK OFFICE
CERTIFICATE OF CORRECTION

PATENT NO. : 6,999,623 B1  
APPLICATION NO. : 09/676680  
DATED : February 14, 2006  
INVENTOR(S) : Yamaoka et al.

Page 1 of 1

It is certified that error appears in the above-identified patent and that said Letters Patent is hereby corrected as shown below:

On the cover page, item (56) References Cited, please insert:

U.S. PATENT DOCUMENTS  
5,258,924     11/1993  Call et al.  
4,014,000     3/1977   Uno et al.

FOREIGN PATENT DOCUMENTS  
EP    0755024    1/1997

In column 19, line 55 of the Letters Patent, in claim 10, "learning means a learning image database" should read --a learning image database--.

In column 19, line 57 of the Letters Patent, in claim 10, "of an objects" should read --of an object--.

In column 20, line 55 of the Letters Patent, in claim 11, "and (f) and (g) for each" should read --and (f) for each--.

In column 20, line 57 of the Letters Patent, in claim 11, "the object to be identified is present" should read --the object is present--.

Signed and Sealed this

Eleventh Day of July, 2006

JON W. DUDAS  
*Director of the United States Patent and Trademark Office*